US 8,138,693 B2

(12) United States Patent
Terada et al.

(10) Patent No.: US 8,138,693 B2
(45) Date of Patent: Mar. 20, 2012

(54) VIBRATION ISOLATION CONTROL SYSTEM

(75) Inventors: Kei Terada, Chiyoda-ku (JP); Tetsuaki Nagano, Chiyoda-ku (JP); Kiyoshi Maekawa, Chiyoda-ku (JP); Emiko Hayasaka, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 479 days.

(21) Appl. No.: 12/516,755

(22) PCT Filed: Nov. 27, 2007

(86) PCT No.: PCT/JP2007/072845
§ 371 (c)(1),
(2), (4) Date: May 28, 2009

(87) PCT Pub. No.: WO2008/066035
PCT Pub. Date: Jun. 5, 2008

(65) Prior Publication Data
US 2010/0060220 A1 Mar. 11, 2010

(30) Foreign Application Priority Data

Nov. 30, 2006 (JP) ................................ 2006-323599
Apr. 3, 2007 (JP) ................................ 2007-097843

(51) Int. Cl.
*H02K 33/00* (2006.01)
(52) U.S. Cl. ......... 318/119; 318/114; 318/686; 318/702
(58) Field of Classification Search .................. 318/114, 318/119, 686, 702
See application file for complete search history.

(56) References Cited

U.S. PATENT DOCUMENTS

| 5,428,285 | A | 6/1995 | Koyama et al. | |
|---|---|---|---|---|
| 6,385,498 | B1 * | 5/2002 | Hayashi | 700/121 |
| 6,472,840 | B1 * | 10/2002 | Takahashi | 318/649 |
| 6,943,522 | B2 | 9/2005 | Nagaoka et al. | |
| 2002/0080339 | A1 * | 6/2002 | Takahashi | 355/72 |
| 2006/0206237 | A1 * | 9/2006 | Morisada | 700/280 |

FOREIGN PATENT DOCUMENTS

| JP | 03-107639 A | 5/1991 |
|---|---|---|
| JP | 05-250041 A | 9/1993 |
| JP | 06-248972 A | 9/1994 |
| JP | 07-110716 A | 4/1995 |

(Continued)

OTHER PUBLICATIONS

Korean Office Action corresponding to Korean Patent Application No. 10-2009-7010715, dated Mar. 9, 2011.

*Primary Examiner* — Walter Benson
*Assistant Examiner* — Jorge Carrasquillo
(74) *Attorney, Agent, or Firm* — Sughrue Mion, PLLC

(57) ABSTRACT

A computing unit simulates an ideal operation of a vibration excitation actuator by using at least a model operation parameter and the vibration-excitation movable mass data and calculates a parameter corresponding to acceleration/deceleration thrust for moving the vibration-excitation movable mass. A vibration isolation controller determines a control content of a vibration isolation driving unit based on the parameter corresponding to the acceleration/deceleration thrust and controls an operation of the vibration isolation driving unit so that a force canceling a reaction force, which acts on an apparatus when a vibration-excitation movable mass is moved, acts on the apparatus by moving the vibration isolation movable unit.

9 Claims, 10 Drawing Sheets

FOREIGN PATENT DOCUMENTS

| | | |
|---|---|---|
| JP | 08-301110 A | 11/1996 |
| JP | 09-236149 A | 9/1997 |
| JP | 11-065677 A | 3/1999 |
| JP | 2000-077503 A | 3/2000 |
| JP | 2000077503 A * | 3/2000 |
| JP | 2000-110883 A | 4/2000 |
| JP | 2000-250638 A | 9/2000 |
| JP | 2002-276728 A | 9/2002 |
| JP | 2003-314610 A | 11/2003 |
| JP | 2005-212008 A | 8/2005 |
| JP | 2005212008 A * | 8/2005 |
| JP | 2006-153129 A | 6/2006 |

* cited by examiner

VIBRATION ISOLATION CONTROL SYSTEM

TECHNICAL FIELD

The present invention relates to a vibration isolation control system that suppresses, in an apparatus in which an actuator is provided to move an object in a predetermined direction based on a control command, a vibration induced by the operation of the actuator.

BACKGROUND ART

Nowadays, an actuator that is controlled by a controller to move an object, such as a workpiece or a product, in a predetermined direction is employed in various apparatuses such as semiconductor manufacturing apparatuses, various kinds of machine tools, and a conveyer. An apparatus including such an actuator (hereinafter, "vibration excitation actuator") vibrates inevitably because a reaction force induced by the operation of the vibration excitation actuator becomes a vibration exciting force. Particularly, in an apparatus including a vibration excitation actuator that obtains thrust by employing a combination of a rotary type motor and a ball screw, a vibration excitation actuator that obtains thrust with a linear motor, or the like, a comparatively large vibration exciting force is produced at the time of acceleration or deceleration for moving an object.

When a large vibration exciting force acts on a machine tool when machining an object, processing accuracy degrades because a vibration excitation actuator and a workpiece are vibrated due to the vibration of the machine tool. In this case, the machine tool can be the machine tool mentioned above that machines a workpiece while moving a tool by means of the vibration excitation actuator or the machine tool mentioned above that machines a workpiece while moving the workpiece by means of the vibration excitation actuator. To machine a workpiece with high form accuracy and high positional accuracy, it is preferable to suppress the vibration of the apparatus (machine tool) as much as possible, which is induced by the operation of a vibration excitation actuator. Moreover, in a conveyer that conveys a conveying target object, such as a workpiece or a product, to a predetermined point by moving the conveying target object by means of the vibration excitation actuator, it is preferable that a vibration exciting force induced by the operation of the vibration excitation actuator be suppressed as much as possible so that the conveying target does not hit against the conveyer or another conveying target object or falling down.

An active mass damper described in, for example, Patent Document 1 has been known as a device that employs a technique for suppressing a vibration acting on an apparatus with the operation of a vibration excitation actuator. The active mass damper includes a support device that supports a weight in a horizontal direction, a weight driving device that drives the weight, and a controller that controls the weight driving device, and is arranged in a machining apparatus so that the direction of movement of the weight is parallel to the direction of movement of a first moving unit in the machining apparatus and suppresses the vibration. At this time, the controller performs a feed-forward control on the weight driving device based on a torque command value provided to a driving unit that drives the first moving unit and a torque command value provided to a driving unit that drives another moving unit, and also performs a feedback control on the weight driving device based on the displacement of the weight.

Patent Document 1: Japanese Patent Application Laid-open No. 2005-212008

DISCLOSURE OF INVENTION

Problem to be Solved by the Invention

However, because these torque command values include disturbance such as friction torque and noises when the feed-forward control of the weight driving device in the active mass damper described in Patent Document 1 is performed based on the torque command value provided to the driving unit that drives the first moving unit and the torque command value provided to the driving unit that drives the other moving unit, a feed-forward control corresponding to an acceleration/deceleration torque component due to which the machining apparatus vibrates can not be performed properly. Therefore, even if the feed-forward control and the feedback control of the weight driving device based on the displacement of the weight are performed by a combination of these controls, it is difficult to cancel out with high accuracy a vibration exciting force induced by the operation of the vibration excitation actuator (the first moving unit), so that it is difficult to accurately suppress a vibration induced by the operation of the vibration excitation actuator.

The present invention has been achieved in view of the above issues, and an object of the invention is to provide a vibration isolation control system that cancels out a vibration exciting force induced by the operation of a vibration excitation actuator with high accuracy and easily suppresses the vibration of an apparatus that includes the vibration excitation actuator.

Means for Solving Problem

To achieve the above object, according to an aspect of the present invention, there is provided a vibration isolation control system that is coupled to an apparatus in which a vibration excitation actuator that includes a vibration excitation movable unit movable in one axial direction is arranged and that suppresses a vibration that acts on the apparatus when an object is mounted on the vibration excitation movable unit and the vibration excitation movable unit is moved. The vibration isolation control system includes a storage unit that stores therein a model operation parameter of the vibration excitation actuator and vibration-excitation movable mass data obtained by adding a mass of the vibration excitation movable unit and a mass of the object; a computing unit that calculates a parameter corresponding to acceleration/deceleration thrust for moving the vibration-excitation movable mass by using at least the model operation parameter and the vibration-excitation movable mass data; a vibration isolation actuator that includes a vibration isolation driving unit fixed to the apparatus and a vibration isolation movable unit driven by the vibration isolation driving unit to move in the axial direction; and a vibration isolation controller that determines a control content of the vibration isolation driving unit based on the parameter corresponding to the acceleration/deceleration thrust calculated by the computing unit and controls an operation of the vibration isolation driving unit so that a force canceling a reaction force, which acts on the apparatus when the vibration-excitation movable mass is moved, acts on the apparatus by moving the vibration isolation movable unit.

To achieve the above object, according to another aspect of the present invention, there is provided a vibration isolation control system that is coupled to an apparatus in which a plurality of vibration excitation actuators each including a vibration excitation movable unit movable in one axial direction is arranged and that suppresses a vibration that acts on the apparatus when an object is mounted on at least one of the vibration excitation movable units moving in a predetermined axial direction and the vibration excitation movable units are moved. The vibration isolation control system includes a storage unit that stores therein a model operation parameter of a vibration excitation actuator of which the vibration excitation movable unit moves in the predetermined axial direction and vibration-excitation movable mass data obtained by adding a mass of the vibration excitation movable unit moving in the predetermined axial direction and a mass of the object; a computing unit that calculates a parameter corresponding to acceleration/deceleration thrust for moving the vibration-excitation movable mass by using at least the model operation parameter and the vibration-excitation movable mass data; a vibration isolation actuator that includes a vibration isolation driving unit fixed to the apparatus and a vibration isolation movable unit driven by the vibration isolation driving unit to move in the predetermined axial direction; and a vibration isolation controller that determines a control content of the vibration isolation driving unit based on the parameter corresponding to the acceleration/deceleration thrust calculated by the computing unit and controls an operation of the vibration isolation driving unit so that a force canceling a reaction force, which acts on the apparatus when the vibration-excitation movable mass is moved in the predetermined axial direction, acts on the apparatus by moving the vibration isolation movable unit.

Effect of the Invention

Because the vibration isolation control system of the present invention uses a model operation parameter of the vibration excitation actuator when the system calculates a parameter corresponding to acceleration/deceleration thrust for moving a vibration-excitation movable mass, it is easy to calculate a parameter in which real acceleration/deceleration thrust is accurately reflected. Because the control content of the vibration isolation driving unit is determined based on the parameter corresponding to acceleration/deceleration thrust when the vibration isolation actuator is actuated, it is easy to control the operation of the vibration isolation driving unit so that a force canceling out with high precision a reaction force, which acts on the apparatus when the vibration-excitation movable mass is moved, acts on the apparatus by moving the vibration isolation moving unit.

Therefore, the vibration isolation control system of the present invention cancels out with high accuracy a vibration exciting force caused by the operation of the vibration excitation actuator and easily suppresses the vibration of the apparatus in which the vibration excitation actuator is arranged. Processing accuracy is easily improved when the vibration isolation control system is applied to a semiconductor manufacturing apparatus or a machine tool, and it becomes easy to prevent a conveying target object from being damaged or falling down during a conveying process when the system is applied to a conveyer.

EXPLANATIONS OF LETTERS OR NUMERALS

Figure 1:
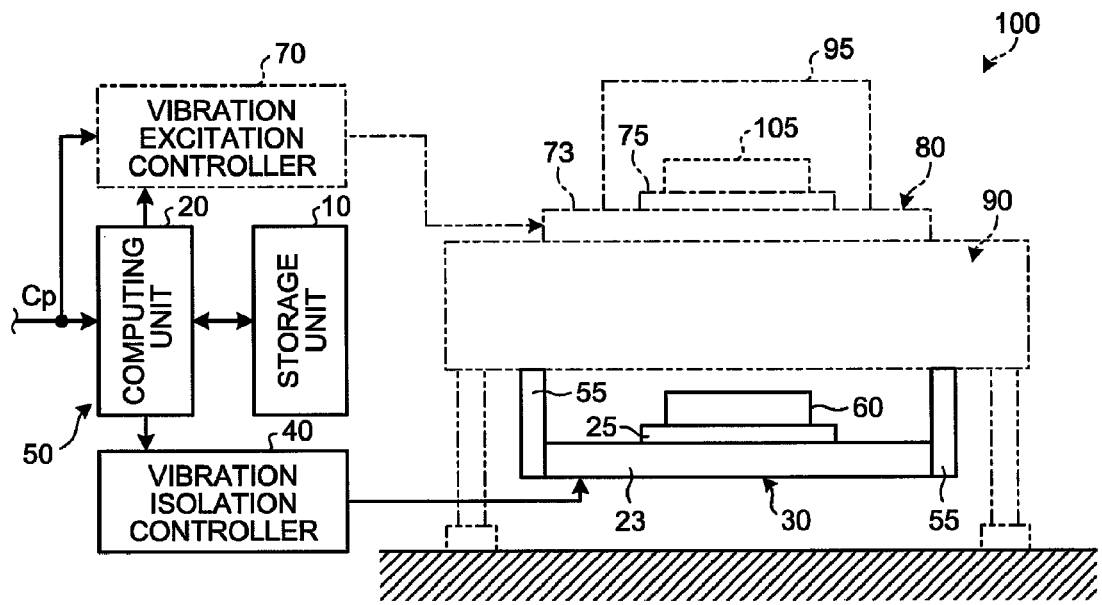
FIG. 1 is a functional block diagram illustrating an example of a basic configuration of a vibration isolation control system of the present invention.

10, 110 storage unit
20, 120, 225, 320 computing unit 23, 23a, 123 vibration isolation driving unit
25, 25a, 125 vibration isolation movable unit
30, 30A, 130 vibration isolation actuator
36, 236, 336, 436, 536 frictional thrust estimating unit
40, 40A, 40B, 140 vibration isolation controller
50, 51, 52, 150 vibration isolation control system
60, 160 weight
70, 70A vibration excitation controller
73, 173a, 173b vibration excitation driving unit
75, 175a, 175b vibration excitation movable unit
80, 180A, 180B vibration excitation actuator
90, 190 supporting unit
100, 102, 200 apparatus
105, 107, 205A, 205B object
170A first vibration excitation controller
170B second vibration excitation controller
Fm model thrust data (parameter)
SF fixed object

BEST MODE(S) FOR CARRYING OUT THE INVENTION

Exemplary embodiments of a vibration resolution control system according to the present invention will be explained below in detail with reference to the accompanying drawings. The present invention is not limited to the embodiments explained below.

First Embodiment

FIG. 1 is a functional block diagram illustrating an example of a basic configuration of a vibration isolation control system of the present invention. A vibration isolation control system 50 shown in FIG. 1 includes a storage unit 10 that stores therein predetermined data, a computing unit 20 that calculates a predetermined parameter, a vibration isolation actuator 30, and a vibration isolation controller 40. The vibration isolation control system 50 is coupled to an apparatus 100 in which a vibration excitation actuator 80 that is controlled by a predetermined controller 70 (hereinafter, "vibration excitation controller 70") to move an object 105 in one axial direction is arranged on a supporting unit 90.

An apparatus to which the vibration isolation control system of the present invention can be coupled can be a semiconductor manufacturing apparatus, various types of machine tools, a conveyer, and so on. The apparatus 100 is a numerically-controlled machine tool in which the vibration excitation actuator 80 and a machining unit 95 are arranged on the supporting unit 90 that functions as a base. The vibration excitation actuator 80 arranged on the supporting unit 90 is a linear motor, and includes a driving unit 73 (hereinafter, "vibration excitation driving unit 73") that is fixed to the supporting unit 90 that functions as a stator and a vibration excitation movable unit 75 that is floating on the vibration excitation driving unit 73 (the stator) to be movable in the axial direction and mounts thereon a workpiece acting as the object 105.

Due to the operation of the vibration excitation actuator 80, in other words, due to the movement of vibration-excitation movable mass obtained by adding the mass of the vibration excitation movable unit 75 and the mass of the object 105, a reaction force is generated. This reaction force acts on the supporting unit 90 as a vibration exciting force thereby vibrating the supporting unit 90. The vibration excitation actuator 80 and the machining unit 95 vibrate due to the vibration of the supporting unit 90, and it leads to the vibration of the apparatus 100. To easily distinguish the apparatus 100 from the vibration isolation control system 50, in FIG. 1, the vibration excitation controller 70, the supporting unit 90, and the machining unit 95 are drawn with two-dot chain lines, the vibration excitation actuator 80 is drawn with a chain line, and the object 105 is drawn with a broken line.

The vibration isolation control system 50 controls the operation of the vibration isolation actuator 30 by means of the vibration isolation controller 40 to actuate the vibration isolation actuator 30 at a predetermined velocity in a predetermined direction, and thus applies a force that cancels out the reaction force to the apparatus 100 thereby suppressing the vibrations of the vibration excitation actuator 80 and the supporting unit 90, and consequently the vibration of the apparatus 100.

For that purpose, the storage unit 10 of the vibration isolation control system 50 stores therein a model operation parameter of the vibration excitation actuator 80 and data indicative of the vibration-excitation movable mass. The model operation parameter is a parameter required for performing modeling for simulating the operation of the control target (the vibration excitation actuator 80) in the computing unit 20. The vibration-excitation movable mass data is, as described above, mass data obtained by adding the mass of the vibration excitation movable unit 75 and the mass of the object 105. When the vibration-excitation movable mass is changed, the current vibration-excitation movable mass stored in the storage unit 10 is updated to an appropriate mass value calculated or estimated in an upper-level controller (not shown) or the vibration excitation controller 70.

The computing unit 20 included in the vibration isolation control system 50 performs modeling for simulating the operation of the control target by using the model operation parameter and the vibration-excitation movable mass data, and calculates a parameter corresponding to acceleration/deceleration thrust that is necessary for moving the vibration-excitation movable mass. Operating amount data of the vibration excitation actuator 80 is required when calculating the acceleration/deceleration thrust. With this respect, a position command Cp supplied from the upper-level controller to the vibration excitation controller 70 is used as the operating amount data.

Because the vibration excitation actuator 80 is a linear motor as described above, the computing unit 20 calculates as the parameter, for example, thrust or acceleration for moving the vibration-excitation movable mass. The vibration isolation controller 40 determines an operating condition of the vibration isolation actuator 30 based on the parameter corresponding to the acceleration/deceleration thrust calculated by the computing unit 20.

The vibration isolation actuator 30 includes a vibration isolation driving unit 23 that is fixed to the supporting unit 90 by fixtures 55 and 55 and a vibration isolation movable unit 25 that is driven by the vibration isolation driving unit 23 to move in a predetermined direction. The operation of the vibration isolation driving unit 23 is controlled by the vibration isolation controller 40. The vibration isolation actuator 30 is a linear motor in which the vibration isolation driving unit 23 that functions as a stator is fixed to the supporting unit 90 by the fixtures 55 and 55, and the vibration isolation movable unit 25 is floating on the vibration isolation driving unit 23 (the stator) to be movable in the axial direction. The vibration isolation actuator 30 is arranged in such a manner that the direction of movement of the vibration isolation movable unit 25 is parallel to the direction of movement of the vibration excitation movable unit 75.

By moving the vibration isolation movable unit 25 in a direction opposite to the direction of movement of the vibration excitation movable unit 75 when the vibration excitation actuator 80 is actuated, a force that cancels out a reaction force acting on the supporting unit 90 (the apparatus 100) when the vibration-excitation movable mass is moved can be caused to act on the supporting unit 90 (the apparatus 100). The force that cancels out the reaction force acting on the supporting unit (the apparatus) when the vibration-excitation movable mass is moved is referred to as "a counter reaction force" in the following explanation.

The vibration isolation controller 40 calculates the magnitude and the direction of the reaction force acting on the supporting unit 90 (the apparatus 100) when the vibration-excitation movable mass is moved based on the parameter corresponding to acceleration/deceleration thrust calculated by the computing unit 20. Then, the vibration isolation controller 40 determines the control content for the vibration isolation driving unit 23 such that a counter reaction force equivalent in magnitude but opposite in direction to the reaction force acts on the supporting unit 90 (the apparatus 100) by moving the vibration isolation movable unit 25. The vibration-isolation movable mass data (i.e., the mass of the vibration isolation movable unit 25) is required in the calculation of the control content. With this respect, the vibration-isolation movable mass data is stored in a desired storage unit in advance. For example, the vibration isolation control system 50 can have a configuration that the storage unit 10 stores therein the mass data of the vibration isolation movable unit 25 and the vibration isolation controller 40 accesses the storage unit 10 to read the data. Alternatively, the vibration isolation control system 50 can have a configuration that a storage unit (not shown) different from the storage unit 10 stores therein the mass data of the vibration isolation movable unit 25 and the vibration isolation controller 40 accesses the different storage unit to read the data.

A counter reaction force can be generated by moving the vibration isolation movable unit 25 even in a direction diagonal to the direction of movement of the vibration excitation movable unit 75. However, because another vibration exciting force is generated due to the movement of the vibration isolation movable unit 25 if the vibration isolation movable unit 25 is moved in this manner, it is preferable that the direction of movement of the vibration isolation movable unit 25 be a direction opposite to the direction of movement of the vibration excitation movable unit 75.

A weight 60 can be placed on the vibration isolation movable unit 25 if required. A desired counter reaction force can easily be obtained with even a small stroke of the vibration isolation movable unit 25 by placing the weight 60 on the vibration isolation movable unit 25. When the weight 60 is placed on the vibration isolation movable unit 25, the vibration isolation controller 40 determines a control content of the vibration isolation driving unit 23 in consideration of the total vibration-isolation movable mass obtained by adding the mass of the vibration isolation movable unit 25 and the mass of the weight 60.

The vibration isolation control system 50 having the configuration described above uses the model operation parameter of the vibration excitation actuator 80 when calculating the parameter corresponding to acceleration/deceleration thrust for moving the vibration-excitation movable mass. Therefore, it is easy to obtain a parameter in which real acceleration/deceleration thrust is accurately reflected. Moreover, when actuating the vibration isolation actuator 30, the system determines a control content of the vibration isolation driving unit 23 based on the parameter corresponding to acceleration/deceleration thrust. Therefore, the system can easily control the operation of the vibration isolation driving unit 23 so that a counter reaction force, which accurately cancels out a reaction force acting on the supporting unit 90 (the apparatus 100) when the vibration-excitation movable mass is moved, acts on the supporting unit 90 (the apparatus 100) by moving the vibration isolation movable unit 25.

As a result, the vibration isolation control system 50 can cancel out with high accuracy a vibration exciting force that acts on the supporting unit 90 (the apparatus 100) due to the operation of the vibration excitation actuator 80. Accordingly, it is possible to easily suppress the vibrations of the vibration excitation actuator 80 and the supporting unit 90 on which the vibration excitation actuator 80 is mounted, and consequently the vibration of the apparatus 100. Therefore, the apparatus 100 that is a numerically-controlled machine tool can machine a workpiece with higher machining accuracy.

The vibration isolation control system 50 having such a technical effect can have various kinds of configurations in addition to the configuration that is illustrated in FIG. 1. Moreover, each of the computing unit 20, the vibration isolation controller 40, and the vibration excitation controller 70 can have various kinds of configurations. For example, the storage unit 10 and the computing unit 20 can be arranged separately from the vibration isolation controller 40 and the vibration excitation controller 70. Alternatively, the storage unit 10 and the computing unit 20 can be incorporated in any one of the vibration isolation controller 40, the vibration excitation controller 70, and the upper-level controller. Considering that both of the computing unit 20 and the vibration excitation controller 70 receive the position command Cp from the upper-level controller and perform a predetermined process, it is preferable that the storage unit 10 and the computing unit 20 be incorporated in the vibration excitation controller 70 from a practical standpoint. Hereinafter, specific configuration of each of the vibration excitation controller, the computing unit, and the vibration isolation controller will be explained below with reference to FIG. 2 to FIG. 4 assuming that the storage unit and the computing unit are incorporated in the vibration excitation controller.

Figure 2:
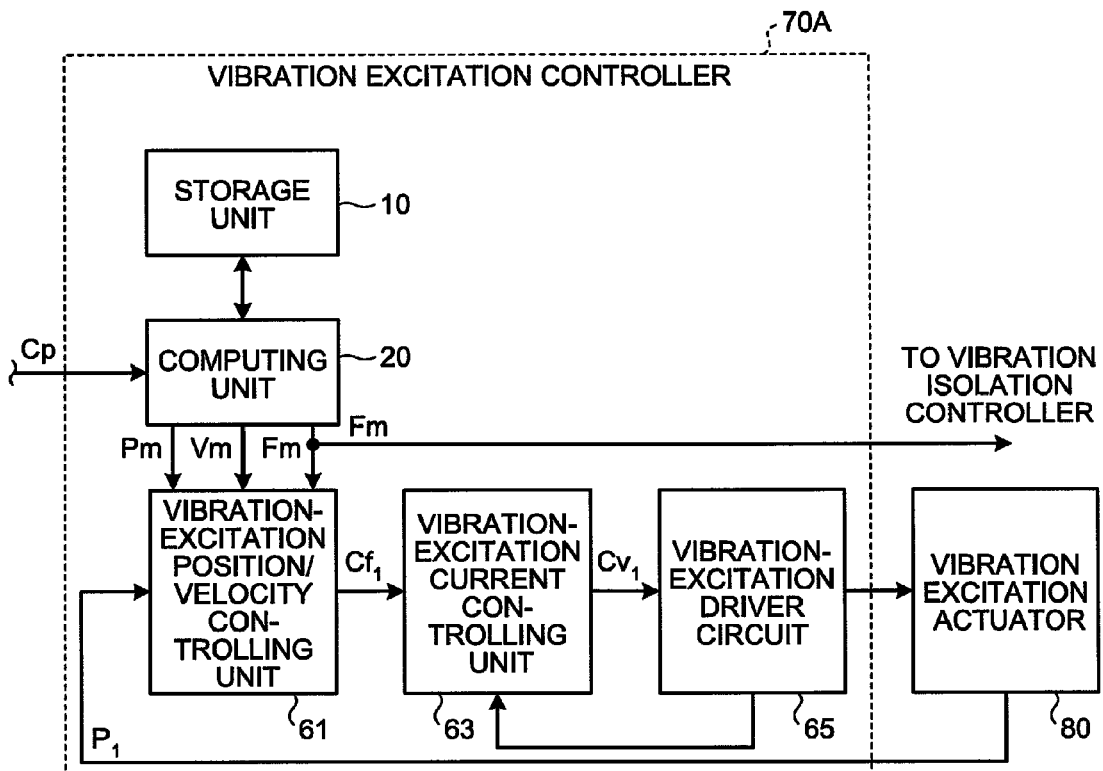
FIG. 2 is a functional block diagram schematically illustrating an example of a vibration excitation controller in which a storage unit and a computing unit constituting the vibration isolation control system of the present invention are incorporated.

FIG. 2 is a functional block diagram schematically illustrating an example of a configuration of a vibration excitation controller in which the storage unit and the computing unit are incorporated. A vibration excitation controller 70A shown in FIG. 2 includes a vibration-excitation position/velocity controlling unit 61, a vibration-excitation current controlling unit 63, and a vibration-excitation driver circuit 65, in addition to the storage unit 10 and the computing unit 20. The vibration-excitation position/velocity controlling unit 61 creates a thrust command $Cf_1$ for moving the vibration-excitation movable mass. The vibration-excitation current controlling unit 63 controls a driving current to be supplied to the vibration excitation actuator 80. The vibration-excitation driver circuit 65 actually supplies the driving current to the vibration excitation actuator 80.

The position command Cp received from the upper-level controller is input into the computing unit 20 in the vibration excitation controller 70A. Upon receiving the position command Cp, the computing unit 20 performs a predetermined operation by using the model operation parameter and the vibration-excitation movable mass data stored in the storage unit 10 to calculate a model position, a model velocity, and a model thrust for simulating an ideal real operation of the vibration excitation movable unit 75 (see FIG. 1), and sends the calculated data to the vibration-excitation position/velocity controlling unit 61. Hereinafter, the data indicative of the model position is referred to as "model position data Pm", the data indicative of the model velocity is referred to as "model velocity data Vm", and the data indicative of the model thrust is referred to as "model thrust data Fm". Because the model thrust data Fm corresponds to "the parameter corresponding to acceleration/deceleration thrust", the model thrust data Fm is also sent to the vibration isolation controller 40 (see FIG. 1).

The vibration-excitation position/velocity controlling unit 61 performs a predetermined operation by using the model position data Pm, the model velocity data Vm, the model thrust data Fm, and real position information $P_1$ of the vibration excitation movable unit 75 being supplied from the vibration excitation actuator 80 to create the thrust command $Cf_1$ for moving the vibration excitation movable unit 75 according to the position command Cp, and provides the thrust command $Cf_1$ to the vibration-excitation current controlling unit 63. The vibration excitation actuator 80 includes a sensing element such as a rotary encoder or a linear encoder to obtain the real position information $P_1$.

Upon receiving the thrust command $Cf_1$, the vibration-excitation current controlling unit 63 creates a voltage command $Cv_1$ for controlling the magnitude of a driving current to be supplied to the vibration excitation actuator 80 according to the content of the thrust command $Cf_1$, and provides the voltage command $Cv_1$ to the vibration-excitation driver circuit 65. Then, the vibration-excitation driver circuit 65 actually supplies a driving current to the vibration excitation actuator 80 under the control of the vibration-excitation current controlling unit 63. Then, the vibration excitation actuator 80, which receives the driving current from the vibration-excitation driver circuit 65, is actuated by the driving current to move the vibration excitation movable unit 75 to a predetermined position at a predetermined velocity. In other words, the vibration excitation actuator moves the vibration-excitation movable mass to the predetermined position under predetermined acceleration/deceleration thrust. In addition, the output of the vibration-excitation driver circuit 65 is fed back to the vibration-excitation current controlling unit 63.

In this manner, because the vibration excitation controller 70A including the storage unit 10 and the computing unit 20 can obtain from the computing unit 20 control data such as position, velocity, and thrust for the vibration excitation movable unit 75, which are necessary when the vibration-excitation position/velocity controlling unit 61 creates the thrust command $Cf_1$, the circuit configuration can be simplified and the number of calculations can be reduced compared with the case where the computing unit 20 is provided separately from the vibration excitation controller. The computing unit 20 can have the same configuration whether the computing unit 20 is incorporated in or is provided separately from the vibration excitation controller 70. Meanwhile, when the computing unit 20 is provided separately from the vibration excitation controller 70, functions of the computing unit 20 for outputting the model position data Pm and the model velocity data Vm can be omitted.

Figure 3:
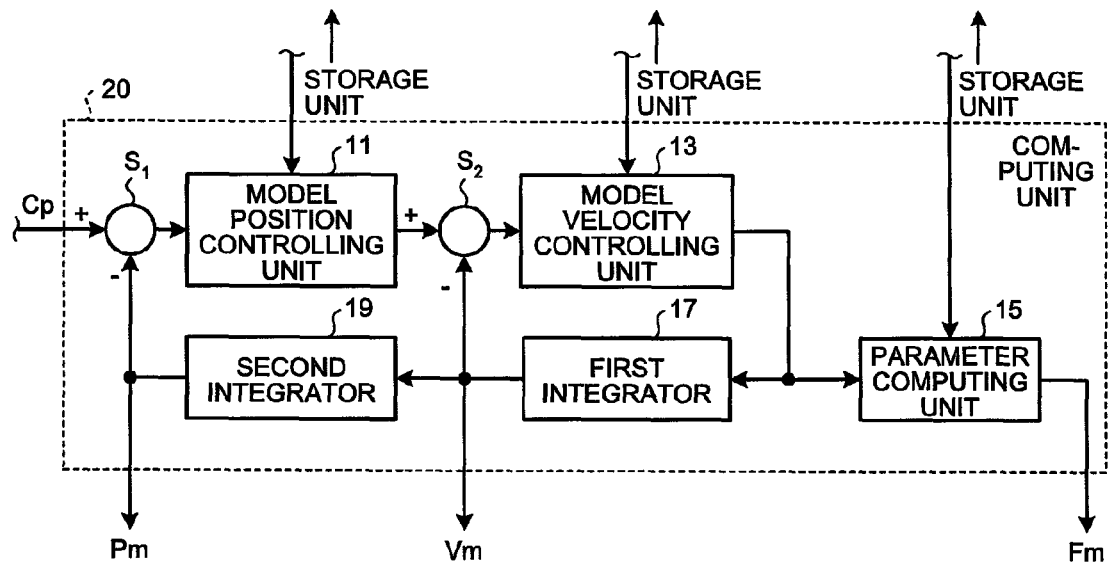
FIG. 3 is a functional block diagram schematically illustrating an example of the computing unit constituting the vibration isolation control system of the present invention, which is incorporated in the vibration excitation controller.

FIG. 3 is a functional block diagram schematically illustrating an example of the computing unit that is incorporated in the vibration excitation controller. The computing unit 20 shown in FIG. 3 includes a model position controlling unit 11, a model velocity controlling unit 13, a parameter computing unit 15, a first integrator 17, a second integrator 19, and two subtracters $S_1$ and $S_2$. The model position controlling unit 11 performs position control for moving the vibration excitation movable unit 75 (see FIG. 1) in accordance with the position command Cp. The model velocity controlling unit 13 controls velocity for moving the vibration excitation movable unit 75. The parameter computing unit 15 calculates a parameter corresponding to acceleration/deceleration thrust for moving the vibration excitation movable unit 75. The first integrator 17 integrates the data of acceleration calculated by the model velocity controlling unit 13. The second integrator 19 integrates a signal output from the first integrator 17.

The subtracter $S_1$ in the computing unit 20 receives the position command Cp from the upper-level controller, and calculates the difference between the position command Cp and the output signal of the second integrator 19. The signal output from the subtracter $S_1$ is input into the model position controlling unit 11. The model position controlling unit 11 calculates a velocity for moving the vibration excitation movable unit 75 in accordance with the position command Cp, based on a signal input from the subtracter $S_1$ and the model operation parameter of the vibration excitation actuator stored in the storage unit 10 (see FIG. 2). The subtracter $S_2$ receives the velocity data calculated by the model position controlling unit 11, and calculates the difference between the velocity data and the output signal of the first integrator 17. The signal output from the subtracter $S_2$ is input into the model velocity controlling unit 13. The model velocity controlling unit 13 calculates an acceleration for moving the vibration excitation movable unit 75 in accordance with the position command Cp, based on a signal input from the subtracter $S_2$ and the model operation parameter of the vibration excitation actuator stored in the storage unit 10. The acceleration data is supplied to the parameter computing unit 15 and the first integrator 17.

The parameter computing unit 15, which receives the acceleration data calculated by the model velocity controlling unit 13, calculates model thrust that is ideal acceleration/deceleration thrust for moving the vibration excitation movable unit 75 in accordance with the position command Cp, based on the acceleration data and the vibration-excitation movable mass data stored in the storage unit 10. A thrust F is expressed by Equation F=aM when an object having a mass M is moved at an acceleration a. The model thrust data (Fm) calculated by the parameter computing unit 15 is supplied to the vibration-excitation position/velocity controlling unit 61 (see FIG. 2) and the vibration isolation controller 40 (see FIG. 1) as already explained above.

The first integrator 17 integrates the acceleration data calculated by the model velocity controlling unit 13 to calculate the model velocity data Vm, and supplies the model velocity data Vm to the vibration-excitation position/velocity controlling unit 61 (see FIG. 2) as well as the subtracter $S_2$ and the second integrator 19. The second integrator 19 integrates the model velocity data Vm calculated by the first integrator 17 to calculate the model position data Pm, and supplies the model position data Pm to the vibration-excitation position/velocity controlling unit 61 (see FIG. 2) as well as the subtracter $S_1$.

Figure 4:
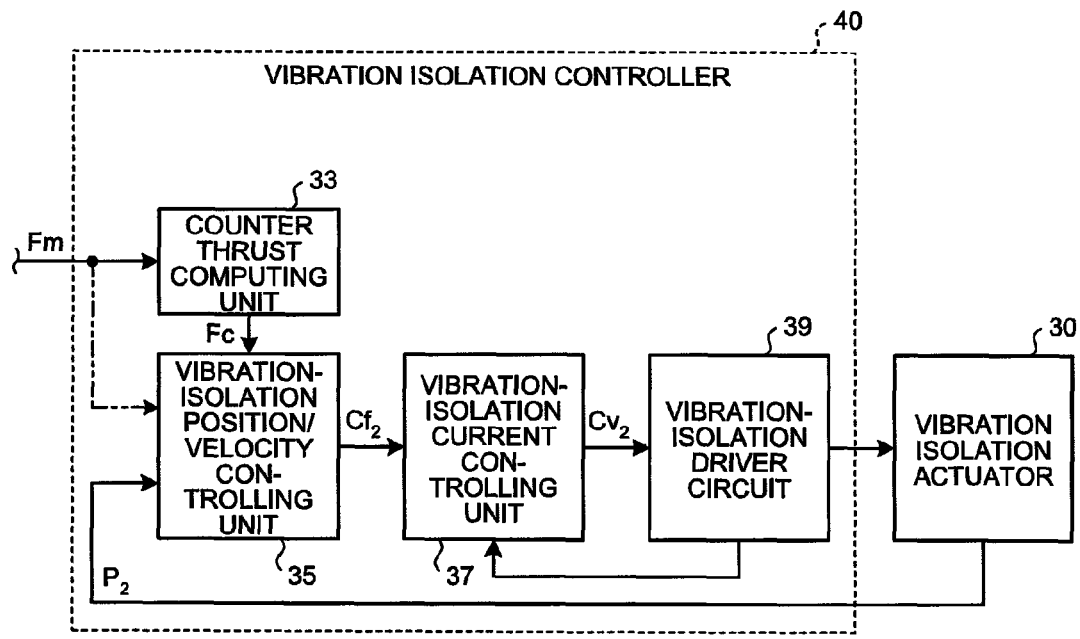
FIG. 4 is a functional block diagram schematically illustrating an example of a vibration isolation controller when the computing unit constituting the vibration isolation control system of the present invention is incorporated in the vibration excitation controller.

FIG. 4 is a functional block diagram schematically illustrating an example of the vibration isolation controller when the computing unit is incorporated in the vibration excitation controller. The vibration isolation controller 40 shown in FIG. 4 includes a counter thrust computing unit 33, a vibration-isolation position/velocity controlling unit 35, a vibration-isolation current controlling unit 37, and a vibration-isolation driver circuit 39. The counter thrust computing unit 33 calculates a counter reaction force that should act on the supporting unit 90 (the apparatus 100, see FIG. 1) by the vibration isolation movable unit 25 when the vibration-excitation movable mass is moved. The vibration-isolation position/velocity controlling unit 35 creates a thrust command $Cf_2$ for moving the vibration isolation movable unit 25. The vibration-isolation current controlling unit 37 controls the magnitude of a driving current to be supplied to the vibration isolation actuator 30. The vibration-isolation driver circuit 39 actually supplies the driving current to the vibration isolation actuator 30.

In the vibration isolation controller 40, the counter thrust computing unit 33 receives the model thrust data Fm from the computing unit 20 (see FIGS. 2 and 3). Then, the counter thrust computing unit 33 calculates the magnitude and the direction of an acceleration/deceleration thrust of the vibration isolation movable unit 25 such that a force acting on the supporting unit 90 (the apparatus 100) becomes a counter reaction force when the vibration isolation movable unit 25 is moved. In other words, the counter thrust computing unit 33 calculates the magnitude and the direction of the acceleration/deceleration thrust of the vibration isolation movable unit 25 so that a force acting on the supporting unit 90 when the vibration isolation movable unit 25 is moved and a reaction force acting on the supporting unit 90 when the vibration-excitation movable mass is moved are equivalent in magnitude but opposite in direction. In this way, data Fc (hereinafter, "counter thrust data Fc"), which corresponds to the acceleration/deceleration thrust of the vibration isolation movable unit 25 and its direction calculated by the counter thrust computing unit 33, is supplied to the vibration-isolation position/velocity controlling unit 35.

The vibration-isolation position/velocity controlling unit 35 performs a predetermined operation by using the counter thrust data Fc and real position information $P_2$ of the vibration isolation movable unit 25 supplied from the vibration isolation actuator 30 to create a thrust command $Cf_2$ for moving the vibration isolation movable unit 25, and supplies the created thrust command $Cf_2$ to the vibration-isolation current controlling unit 37. At this time, the vibration-isolation position/velocity controlling unit 35 creates the thrust command $Cf_2$ so that the vibration isolation movable unit 25 does not reach a stroke end. The vibration isolation actuator 30 includes a sensing element, such as a rotary encoder or a linear encoder, to obtain the real position information $P_2$. If required, the vibration isolation controller 40 can have a configuration that the vibration-isolation position/velocity controlling unit 35 also receives the model thrust data Fm. Outputting the model thrust data Fm also to the vibration-isolation position/velocity controlling unit 35 is advantageous in obtaining the thrust command $Cf_2$ for moving the vibration isolation movable unit 25 to generate a high-precision counter reaction force.

Upon receiving the thrust command $Cf_2$, the vibration-isolation current controlling unit 37 creates a voltage command $Cv_2$ for controlling the magnitude of a driving current to be supplied to the vibration isolation actuator 30 in accordance with the content of the thrust command $Cf_2$, and supplies the voltage command $Cv_2$ to the vibration-isolation driver circuit 39. The vibration-isolation driver circuit 39 actually supplies the driving current to the vibration isolation actuator 30 under the control of the vibration-isolation current controlling unit 37. Then, the vibration isolation actuator 30, which receives the driving current from the vibration-isolation driver circuit 39, is actuated in accordance with the driving current, and moves the vibration isolation movable unit 25 to a predetermined position at a predetermined velocity. In other words, the vibration isolation actuator moves the vibration-isolation movable mass to a predetermined position under predetermined acceleration/deceleration thrust. In addition, the output of the vibration-isolation driver circuit 39 is fed back to the vibration-isolation current controlling unit 37.

In the above explanation, although it has been explained with reference to FIG. 2 to FIG. 4 about each configuration of the vibration excitation controller, the computing unit, and the vibration isolation controller when the storage unit and the computing unit are incorporated in the vibration excitation controller, each of the vibration excitation controller, the computing unit, and the vibration isolation controller can have a configuration different from the above configuration. Examples of such configuration will be explained below.

Second Embodiment

According to the vibration isolation control system of the present invention, the vibration isolation controller can include a frictional thrust estimating unit if required. The frictional thrust estimating unit estimates frictional thrust caused by the movement of the vibration isolation movable unit. The vibration isolation controller including the frictional thrust estimating unit determines the control content of the vibration isolation driving unit, based on the frictional thrust estimated by the frictional thrust estimating unit and the parameter (the model thrust data Fm) explained in the first embodiment. In this case, the entire configuration of the vibration isolation control system is the same as that of the vibration isolation control system explained in the first embodiment, but the internal configuration of the vibration isolation controller is slightly different from that of the vibration isolation controller explained in the first embodiment.

Figure 5:
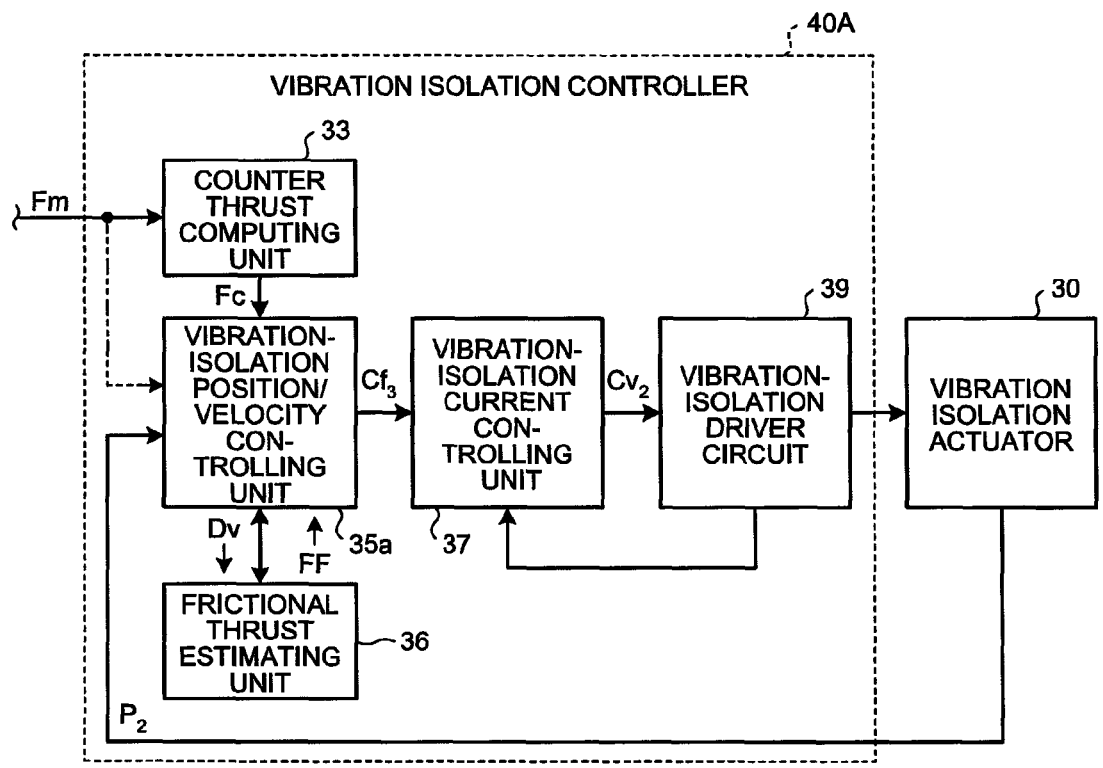
FIG. 5 is a functional block diagram schematically illustrating an example of the vibration isolation controller including a frictional thrust estimating unit, which constitutes the vibration isolation control system of the present invention.
Figure 6:
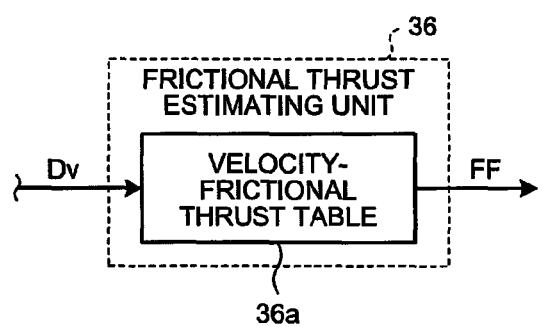
FIG. 6 is a functional block diagram schematically illustrating an example of configuration of the frictional thrust estimating unit shown in FIG. 5.

FIG. 5 is a functional block diagram schematically illustrating an example of a vibration isolation controller including a frictional thrust estimating unit, and FIG. 6 is a functional block diagram schematically illustrating an example of the configuration of the frictional thrust estimating unit.

A vibration isolation controller 40A shown in FIG. 5 has the same configuration as that of the vibration isolation controller 40 shown in FIG. 4, except that the vibration isolation controller 40A includes a frictional thrust estimating unit 36 and a vibration-isolation position/velocity controlling unit 35a that has an additional specific function. In FIG. 5, the components that have the same functions as those of the components shown in FIG. 4 are denoted by the same reference numbers, and the explanations thereof are omitted.

The vibration-isolation position/velocity controlling unit 35a supplies data Dv (hereinafter, "velocity data Dv"), which is indicative of the velocity of the vibration isolation movable unit calculated in a process of creating a thrust command $Cf_3$, to the frictional thrust estimating unit 36. As shown in FIG. 6, the frictional thrust estimating unit 36 includes a velocity-frictional thrust table 36a that is a lookup table expressing correspondence relationship between velocity and frictional thrust of the vibration isolation movable unit 25 in the vibration isolation actuator 30. If the frictional thrust estimating unit 36 receives the velocity data Dv from the vibration-isolation position/velocity controlling unit 35a, the frictional thrust estimating unit 36 estimates frictional thrust for moving the vibration isolation movable unit 25 from the velocity-frictional thrust table 36a in accordance with the velocity data Dv, and supplies the estimated result (hereinafter, "frictional thrust estimation data FF") to the vibration-isolation position/velocity controlling unit 35a.

As shown in FIG. 5, the vibration-isolation position/velocity controlling unit 35a receives the frictional thrust estimation data FF, and then creates the thrust command $Cf_3$ for moving the vibration isolation movable unit 25 based on the counter thrust data Fc, the real position information $P_2$ of the vibration isolation movable unit 25 to be supplied from the vibration isolation actuator 30, and the frictional thrust estimation data FF. Specifically, the thrust command $Cf_3$ is created so that a thrust corresponding to a sum of thrust expressed by the counter thrust data Fc and frictional thrust expressed by the frictional thrust estimation data FF is added to the vibration isolation actuator 30.

If the thrust command $Cf_3$ is created in this way, a counter reaction force can be easily obtained with high precision by moving the vibration isolation movable unit 25. The vibration isolation actuator, on which frictional thrust acts when the vibration isolation movable unit 25 is moved, cannot obtain a high-precision counter reaction force when the actuator moves the vibration isolation movable unit 25 in accordance with the thrust command made by the vibration-isolation position/velocity controlling unit without considering the frictional thrust. However, a high-precision counter reaction force can be easily obtained when the thrust command $Cf_3$ is calculated from a force obtained by adding a frictional thrust to a force expressed by the counter thrust data Fc, by using the counter thrust data Fc and the frictional thrust estimation data FF.

Third Embodiment

The vibration isolation control system of the present invention can have a configuration that a vibration isolation actuator is placed between an apparatus to be isolated from vibration and a fixed object located lateral to the apparatus. In this case, the entire configuration of the vibration isolation control system can be the same as that of the vibration isolation control system explained in the first embodiment. However, the vibration isolation actuator uses a linear actuator capable of pushing or drawing the apparatus (the supporting member) in a direction parallel to the direction in which the object is moved by the vibration excitation actuator.

Figure 7:
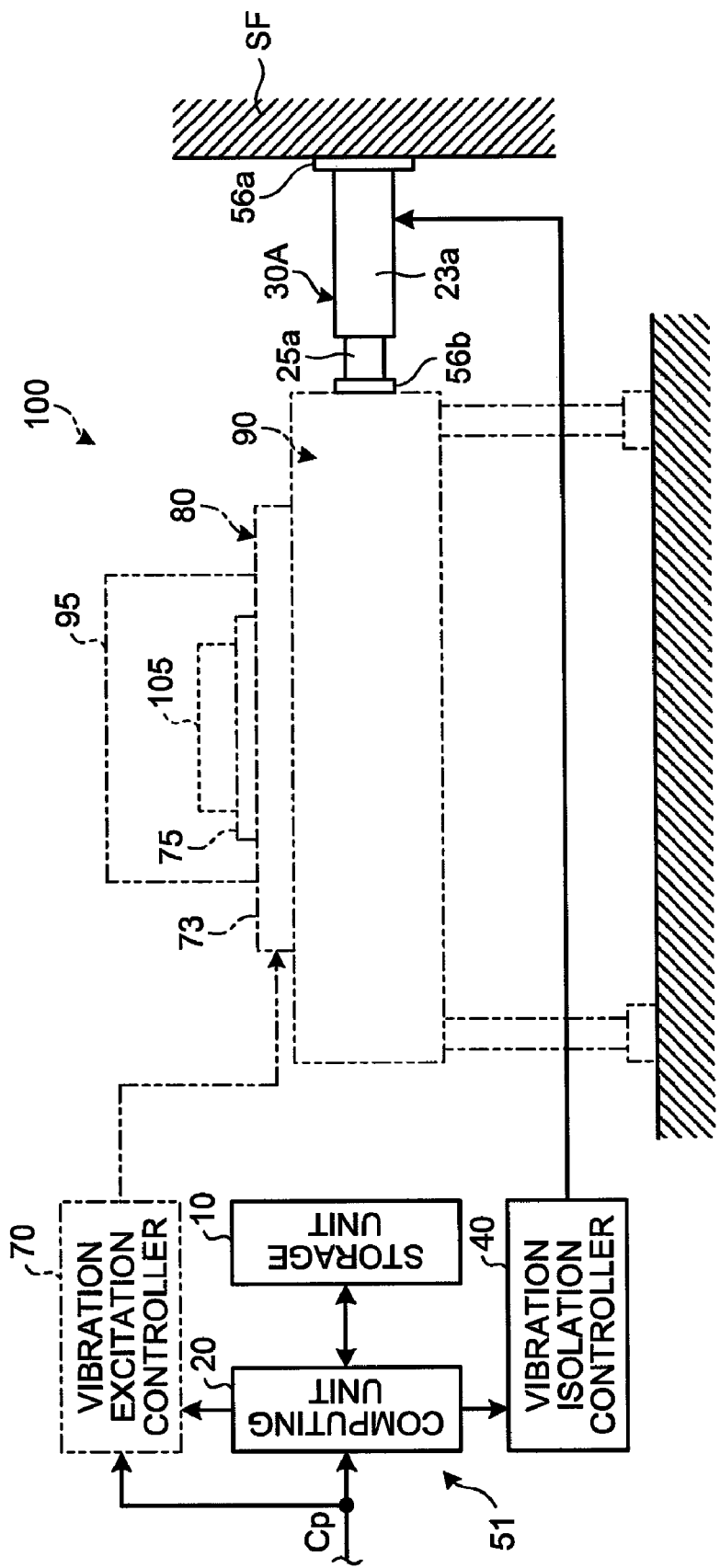
FIG. 7 is a functional block diagram schematically illustrating an example of a vibration isolation control system of the present invention when a vibration isolation actuator is placed between an apparatus to be isolated from vibration and a fixed object located lateral to the apparatus.

FIG. 7 is a functional block diagram schematically illustrating an example of a vibration isolation control system when a vibration isolation actuator is placed between an apparatus to be isolated from vibration and a fixed object located lateral to the apparatus. A vibration isolation control system 51 shown in FIG. 7 has a configuration similar to that of the vibration isolation control system 50 shown in FIG. 1, except that a vibration isolation actuator 30A is placed between the apparatus 100 and a fixed object SF located lateral to the apparatus 100. In FIG. 7, the components that have the same functions as those of the components shown in FIG. 1 are denoted by the same reference numbers, and the explanations thereof are omitted.

In the vibration isolation actuator 30A, one end of a vibration isolation driving unit 23a is fixed to the fixed object SF (for example, a wall or the like of a building) by a fixture 56a, and one end of a vibration isolation movable unit 25a is fixed to the supporting unit 90 of the apparatus 100 by another fixture 56b. The vibration isolation movable unit 25a is driven by the vibration isolation driving unit 23a to move in a direction parallel to the moving direction of the vibration excitation movable unit 75. The vibration isolation controller 40 controls the operation of the vibration isolation driving unit 23a to move the vibration isolation movable unit 25a at a predetermined velocity in a predetermined direction, and thus can cause a counter reaction force canceling out a reaction force acting on the supporting unit 90 (the apparatus 100) when the vibration excitation movable unit 75 is moved to act on the supporting unit 90 (the apparatus 100).

At this time, it is not necessary to consider the mass of the vibration isolation movable unit 25a and also to utilize a weight. Therefore, the vibration-isolation position/velocity controlling unit 35 (see FIG. 4) constituting the vibration isolation controller 40 performs a predetermined operation by using the counter thrust data Fc (see FIG. 4) calculated by the counter thrust computing unit 33 and the real position information of the vibration isolation movable unit 25a to be supplied from the vibration isolation actuator 30A to create the thrust command $Cf_2$ (see FIG. 4) for moving the vibration isolation movable unit 25a. The mass data of the vibration isolation movable unit 25a is not needed. The weight is not also needed.

Because the vibration isolation control system 51 can cause a desired counter reaction force to act on the supporting unit 90 (the apparatus 100) even though the stroke of the vibration isolation movable unit 25a is small, the vibration isolation actuator 30A can be made small easily compared with the vibration isolation actuator 30 in the vibration isolation control system 50 shown in FIG. 1.

Fourth Embodiment

An apparatus in which the vibration isolation control system of the present invention is provided can be a conveyer. In this case, it is preferable that the conveyer has a configuration that the vibration excitation actuator is arranged under the supporting unit and an object (a conveying target object), which is mounted on the supporting unit, is moved in one axial direction by controlling the operation of the vibration excitation actuator by means of the vibration excitation controller.

Figure 8:
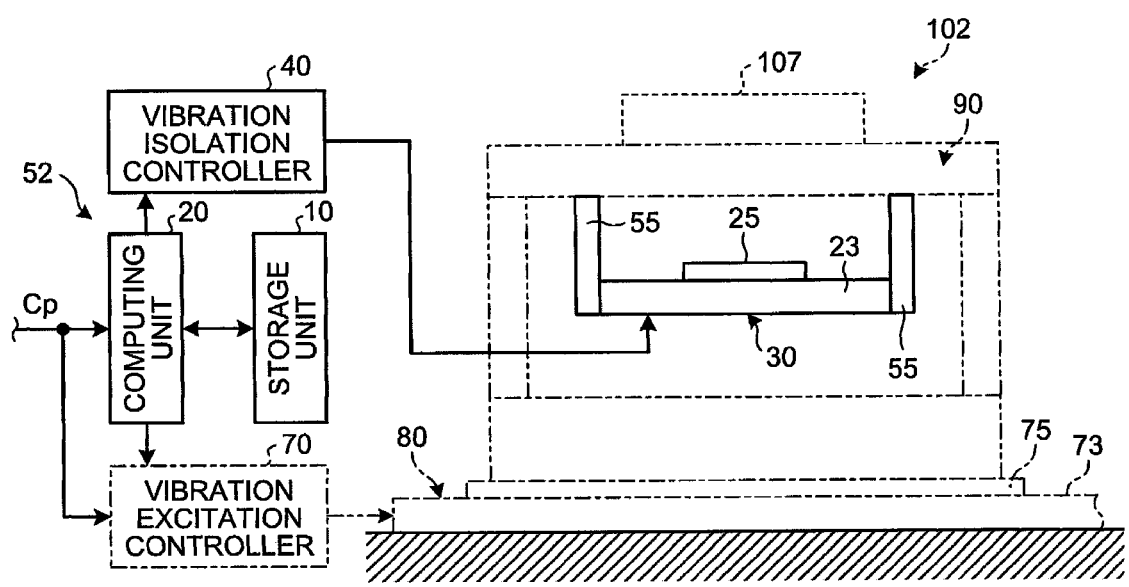
FIG. 8 is a functional block diagram schematically illustrating an example of a vibration isolation control system of the present invention, which is coupled to a conveyer.

FIG. 8 is a functional block diagram schematically illustrating an example of the vibration isolation control system coupled to the conveyer. Because the components shown in FIG. 8 have the same functions as the components shown in FIG. 1, the reference numbers of the components have the same reference numbers as those of the components shown in FIG. 1.

A conveyer 102 shown in FIG. 8 is a conveyer that conveys an object 107, which is mounted on the supporting unit 90, along with the supporting unit in a predetermined axial direction and of which the vibration excitation actuator 80 is coupled to the lower end of the supporting unit 90. The vibration excitation actuator 80 is a linear motor in which the vibration excitation driving unit 73 functioning as a stator is fixedly placed and the vibration excitation movable unit 75 floats on the vibration excitation driving unit 73 (the stator) to move in the axial direction (the conveying direction of the object 107 by the vibration excitation actuator 80). The supporting unit 90 mounting thereon the object 107 is fixedly placed on the vibration excitation movable unit 75.

A vibration isolation control system 52 provided in the conveyer 102 can have the same configuration as that of any one of the vibration isolation control systems explained in the first to third embodiments. The vibration-excitation movable mass of the vibration isolation control system 52 is obtained by adding the mass of the vibration excitation movable unit 75 and the mass of the vibrating part of the conveyer 102. In this case, the major portion of the mass of the vibrating part of the conveyer 102 consists of the mass of the supporting unit 90 and the mass of the object 107. The computing unit 20 calculates a parameter corresponding to acceleration/deceleration thrust for moving the vibration-excitation movable mass by using the model operation parameter and the vibration-excitation movable mass data.

For the reasons similar to those explained in the first to third embodiments, the vibration isolation control system 52 having the above configuration can easily move the vibration isolation movable unit 25 so that a counter reaction force, which cancels out with high accuracy a reaction force acting on the supporting unit 90 (the conveyer 102) when the vibration-excitation movable mass is moved, acts on the supporting unit 90 (the conveyer 102). As a result, the vibration isolation control system 52 can cancel out with high accuracy a vibration exciting force acting on the supporting unit 90 (the conveyer 102) due to the operation of the vibration excitation actuator 80 and thus easily isolate the object from the vibration of the supporting unit 90. In this way, it is easy to prevent the object 107 from hitting against the conveyer 102 or another conveying target object or the object 107 from falling down in the process of conveying the object 107 by means of the conveyer 102.

Fifth Embodiment

The vibration isolation control system of the present invention can be coupled to an apparatus in which a plurality of vibration excitation actuators each having a vibration excitation movable unit movable in one axial direction is arranged. In this case, the vibration excitation actuators can be arranged so that the axial directions thereof are parallel to the one axial direction, or can be divided into a plurality of groups each of which has a different axial direction.

The vibration excitation actuators can be further distributed so as not to be overlapped one another, or can be arranged so that one vibration excitation actuator is overlapped on another vibration excitation actuator like an X-Y stage. The total number of objects capable of being moved by the plurality of vibration excitation actuators is one or more depending on the total number or the arrangement of the vibration excitation actuators. The total number of the vibration excitation controllers is one or more depending on the arrangement of the vibration excitation actuators or the axial direction of each vibration excitation actuator.

Figure 9:
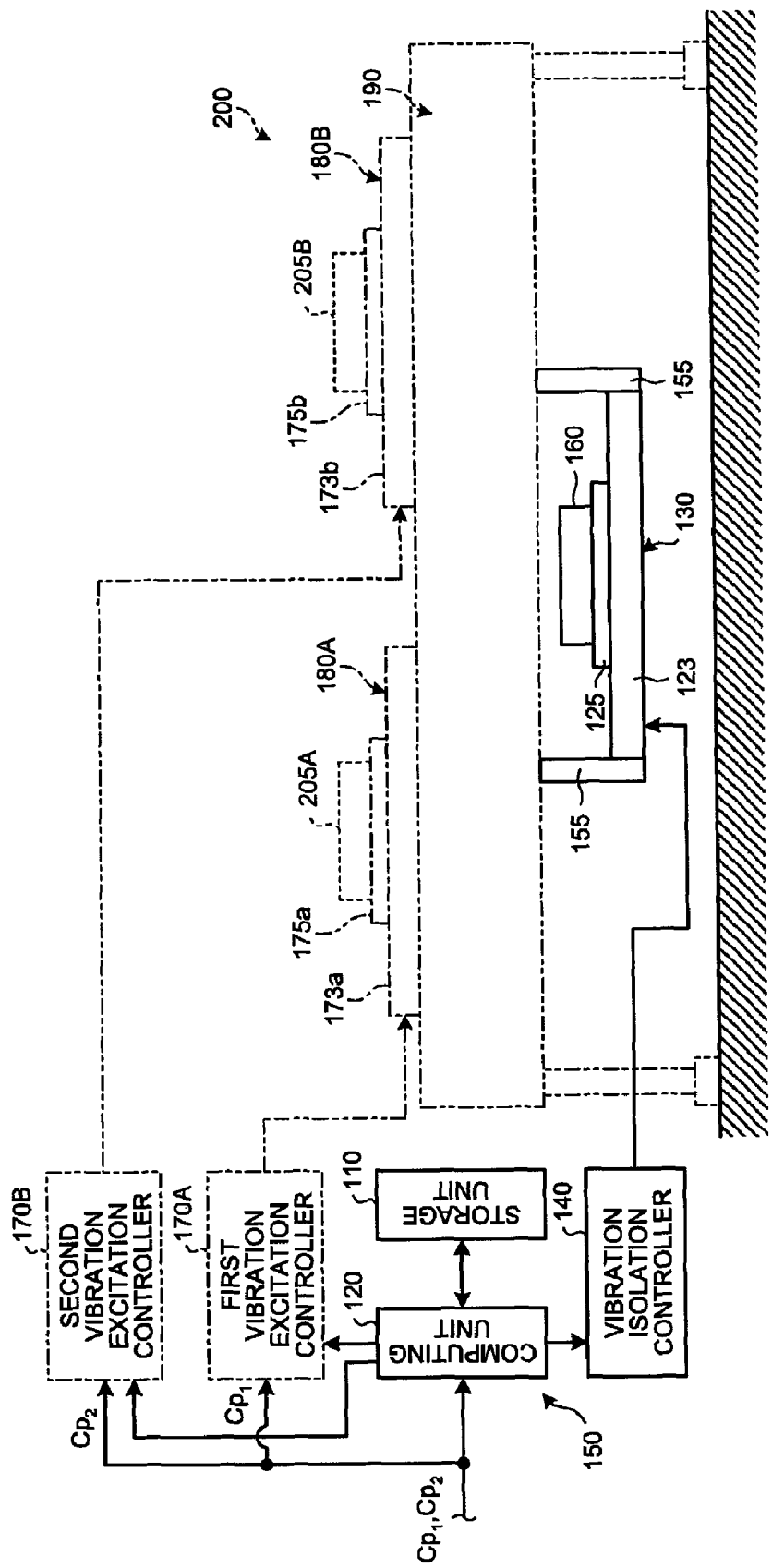
FIG. 9 is a functional block diagram schematically illustrating an example of a vibration isolation control system of the present invention, which is coupled to an apparatus in which a plurality of vibration excitation actuators is arranged.

FIG. 9 is a functional block diagram schematically illustrating an example of the vibration isolation control system coupled to an apparatus in which a plurality of vibration excitation actuators is arranged. A vibration isolation control system 150 shown in FIG. 9 is coupled to an apparatus 200, and the apparatus 200 is a numerically-controlled machine tool that includes a first vibration excitation actuator 180A controlled by a first vibration excitation controller 170A and a second vibration excitation actuator 180B controlled by a second vibration excitation controller 170B.

The first vibration excitation actuator 180A is a linear motor that includes a vibration excitation driving unit 173a that functions as a stator and is fixed to a supporting unit 190 and a vibration excitation movable unit 175a that floats on the vibration excitation driving unit 173a (the stator) to move in a predetermined axial direction (the moving direction of an object 205A by the first vibration excitation actuator 180A). Similarly, the second vibration excitation actuator 180B is a linear motor that includes a vibration excitation driving unit 173b that functions as a stator and is fixed to the supporting unit 190 and a vibration excitation movable unit 175b that floats on the vibration excitation driving unit 173b (the stator) to move in a predetermined axial direction (the moving direction of an object 205B by the second vibration excitation actuator 180B). These two vibration excitation actuators 180A and 180B are arranged so that the directions of movement (the axial directions) of the objects 205A and 205B moved by the vibration excitation movable units 175a and 175b are parallel to each other.

The vibration isolation control system 150 includes a storage unit 110 that stores therein predetermined data, a computing unit 120 that calculates a predetermined parameter, a vibration isolation actuator 130, and a vibration isolation controller 140, and suppresses vibrations acting on the supporting unit 190 (the apparatus 200) due to the movement of the vibration-excitation movable mass of at least one of the two vibration excitation actuators 180A and 180B. Because the first vibration excitation actuator 180A and the second vibration excitation actuator 180B are arranged so that the axial directions thereof are parallel to each other in the shown example, the vibration isolation control system 150 suppresses the vibrations induced by the movements of the vibration-excitation movable masses of the two vibration excitation actuators 180A and 180B.

For that purpose, the storage unit 110 stores therein the model operation parameters and the vibration-excitation movable mass data of the vibration excitation actuators 180A and 180B. The computing unit 120 calculates parameters corresponding to acceleration/deceleration thrust for respectively moving the vibration excitation movable units 175a and 175b in accordance with position commands $Cp_1$ and $Cp_2$, in other words, parameters corresponding to acceleration/deceleration thrust for respectively moving the vibration-excitation movable masses. The parameters corresponding to acceleration/deceleration thrust are calculated by using the position command $Cp_1$ for the first vibration excitation actuator 180A and the position command $Cp_2$ for the second vibration excitation actuator 180B that are supplied from an upper-level controller, the model operation parameters, and the vibration-excitation movable mass data.

Then, the vibration isolation controller 140 determines the control content of a vibration isolation driving unit 123 based on the parameters corresponding to acceleration/deceleration thrust calculated by the computing unit 120 for the respective vibration-excitation movable masses of the vibration excitation actuators 180A and 180B. In this way, the controller 140 controls the operation of the vibration isolation driving unit 123 so that a counter reaction force, which cancels out reaction forces acting on the supporting unit 190 (the apparatus 200) when the vibration-excitation movable masses are moved, acts on the supporting unit 190 (the apparatus 200) by moving a vibration isolation movable unit 125. The vibration isolation controller 140 can have the same configuration as that of the vibration excitation controller of the vibration isolation control system respectively explained in the first to third embodiments. However, the counter thrust computing unit 33 (see FIG. 4) calculates counter thrust data Fc (see FIG. 4) based on the parameter corresponding to acceleration/deceleration thrust of the vibration-excitation movable mass of the vibration excitation actuator 180A and the parameter corresponding to acceleration/deceleration thrust of the vibration-excitation movable mass of the vibration excitation actuator 180B, and supplies the counter thrust data Fc to the vibration-isolation position/velocity controlling unit 35 (see FIG. 4). The magnitude of the counter reaction force that should act on the supporting unit 190 (the apparatus 200) by moving the vibration isolation movable unit 125 is the same as a resultant force obtained by adding a reaction force acting on the supporting unit 190 (the apparatus 200) when the vibration excitation movable unit 175a is moved and a reaction force acting on the supporting unit 190 (the apparatus 200) when the vibration excitation movable unit 175b is moved. The direction of the counter reaction force is opposite to that of the resultant force.

The vibration isolation actuator 130 is a linear motor in which the vibration isolation driving unit 123 functioning as a stator is fixed to the supporting unit 190 by two fixtures 155 and 155 and the vibration isolation movable unit 125 floats on the vibration isolation driving unit 123 (the stator) to move in a predetermined axial direction (the moving direction of the objects 205A and 205B actuated by the vibration excitation actuators 180A and 180B). Similarly to the case of the vibration isolation control system 50 (see FIG. 1) explained in the first embodiment, a weight 160 is placed on the vibration isolation movable unit 125 if required.

The vibration isolation control system 150 having such a configuration cancels out with high accuracy vibration exciting forces acting on the supporting unit 190 (the apparatus 200) due to the operations of the vibration excitation actuators 180A and 180B, and thus easily suppresses the vibrations of the vibration excitation actuators 180A and 180B and the supporting unit 190 and consequently the vibration of the apparatus 200. The processing accuracy of the apparatus 200 that is a numerically-controlled machine tool can be easily improved.

As above, although some embodiments of the vibration isolation control system of the present invention have been explained above, the present invention is not limited to the vibration isolation control system having the configuration. The entire configuration and the internal configuration of each component of the vibration isolation control system of the present invention can be changed in various ways.

For example, although the computing unit 20 as shown in FIG. 3 is a second-order unit that includes the model position controlling unit 11 and the model velocity controlling unit 13, the order of the computing unit included in the vibration isolation control system of the present invention can have a desired number different from the second order and the internal configuration of the computing unit can be appropriately selected.

Figure 10:
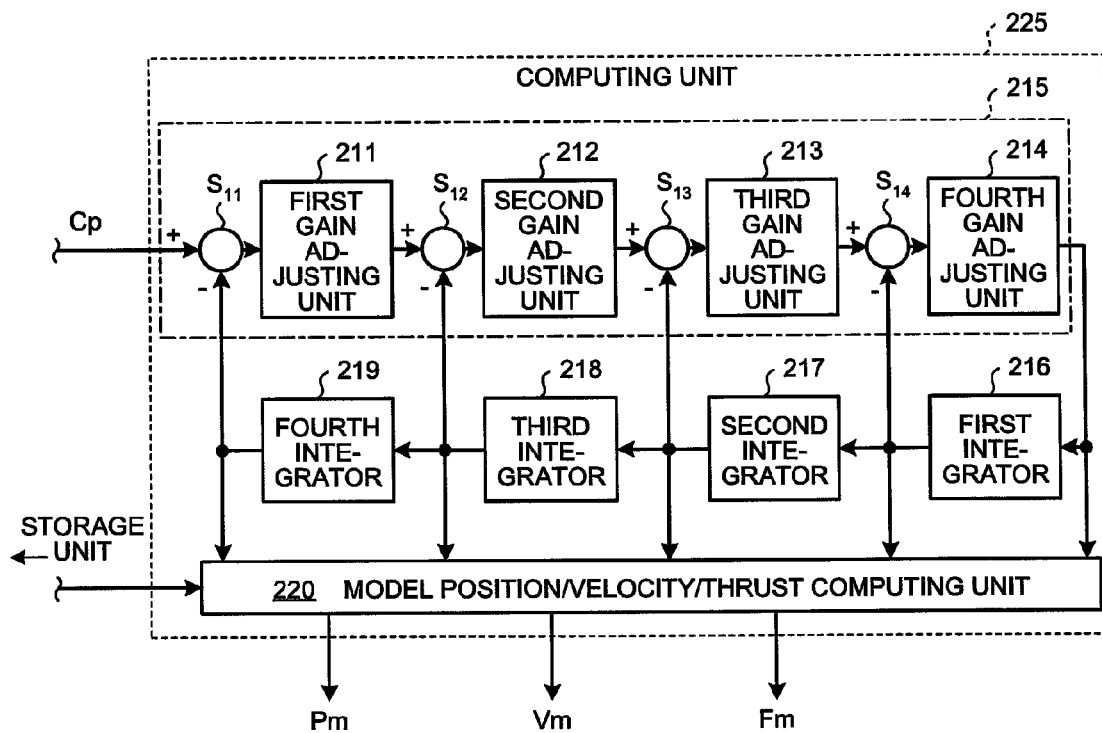
FIG. 10 is a functional block diagram schematically illustrating another example of the computing unit constituting the vibration isolation control system of the present invention.

FIG. 10 is a functional block diagram schematically illustrating another example of a computing unit constituting the vibration isolation control system of the present invention. A computing unit 225 shown in FIG. 10 includes a filter unit 215 that receives a position command Cp from an upper-level controller, first to fourth integrators 216 to 219, and a model position/velocity/thrust computing unit 220.

The filter unit 215 is a four-order unit including four subtracters S11 to S14 and first to fourth gain adjusting units 211 to 214. The subtracter S11, the first gain adjusting unit 211, the subtracter S12, the second gain adjusting unit 212, the subtracter S13, the third gain adjusting unit 213, the subtracter S14, and the fourth gain adjusting unit 214 are connected in series in this order. A signal (a second-order differential value of acceleration data) output from the fourth gain adjusting unit 214 is supplied to the first integrator 216 and the model position/velocity/thrust computing unit 220, and a signal (a first-order differential value of acceleration data) output from the first integrator 216 is supplied to the subtracter S14, the second integrator 217, and the model position/velocity/thrust computing unit 220. Moreover, a signal (acceleration data) output from the second integrator 217 is supplied to the subtracter S13, the third integrator 218, and the model position/velocity/thrust computing unit 220, and a signal (velocity data) output from the third integrator 218 is supplied to the subtracter S12, the fourth integrator 219, and the model position/velocity/thrust computing unit 220. Then, a signal (position data) output from the fourth integrator 219 is supplied to the subtracter S11 and the model position/velocity/thrust computing unit 220.

The model position/velocity/thrust computing unit 220 calculates model position data Pm, model velocity data Vm, and model thrust data Fm in which vibration characteristics of the apparatus are taken into consideration, based on the model operation parameter of the vibration excitation actuator stored in the storage unit 10 (see FIG. 1), the vibration-excitation movable mass data, the output signal of the fourth gain adjusting unit 214, the output signals of the first to the fourth integrators 216 to 219, vibration characteristics of the apparatus to which the vibration isolation control system is coupled, and so on, and then supplies these data to the vibration-excitation position/velocity controlling unit 61 (see FIG. 1). The model thrust data Fm is supplied also to the vibration isolation controller 40 (see FIG. 1). The order of the filter unit 215 is not limited to four, and thus can be a desired number different from a four order.

Figure 11:
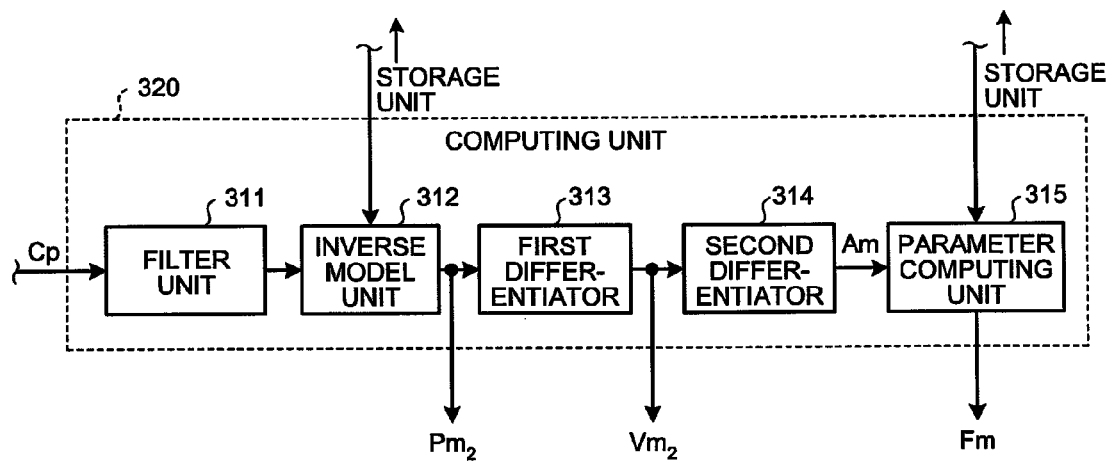
FIG. 11 is a functional block diagram schematically illustrating a still another example of the computing unit constituting the vibration isolation control system of the present invention.

FIG. 11 is a functional block diagram schematically illustrating a still another example of a computing unit constituting the vibration isolation control system of the present invention. A computing unit 320 shown in FIG. 11 includes a filter unit 311 that receives the position command Cp from an upper-level controller, an inverse model unit 312, a first differentiator 313, a second differentiator 314, and a parameter computing unit 315, and these are connected in series in this order. The filter unit 311 has, for example, the configuration as that of the computing unit 20 shown in FIG. 3 from which the parameter computing unit 15 is removed, and derives the model position data Pm and the model velocity data Vm. The inverse model unit 312 calculates model position data $Pm_2$ based on data of an inverse model that is one of actuation models of the vibration excitation actuator and the model position data Pm and the model velocity data Vm that are supplied from the filter unit 311. For example, the inverse model data is stored in the storage unit 10 (see FIG. 1) constituting the vibration isolation control system, and the inverse model unit 312 accesses the storage unit 10 to obtain inverse model data.

The model position data $Pm_2$ calculated by the inverse model unit 312 is supplied to the vibration-excitation position/velocity controlling unit 61 (see FIG. 1), and is also supplied to the first differentiator 313. The first differentiator 313 calculates model velocity data $Vm_2$ based on the model position data $Pm_2$. The model velocity data $Vm_2$ is supplied to the vibration-excitation position/velocity controlling unit 61 (see FIG. 1), and is also supplied to the second differentiator 314. The second differentiator 314 calculates model acceleration data Am based on the model velocity data $Vm_2$. The model acceleration data Am is supplied to the parameter computing unit 315. The parameter computing unit 315 calculates model thrust data Fm for moving the vibration excitation movable unit in accordance with the position command Cp, based on the model acceleration data Am supplied from the second differentiator 314 and the vibration-excitation movable mass data stored in the storage unit 10 (see FIG. 1), and supplies the data Fm to the vibration-excitation position/velocity controlling unit 61 and the vibration isolation controller 40 (see FIG. 1).

Meanwhile, because differential operations may be a factor for amplifying high-frequency noises, it is preferred from a practical standpoint that each of the first differentiator 313 and the second differentiator 314 be replaced by a computing element that performs an operation similar to that of the differentiators 313 and 314 based on an approximate expression or the like. Alternatively, as in the computing unit 20 shown in FIG. 3, it is preferred from a practical standpoint that the first differentiator 313 and the second differentiator 314 be replaced by a circuit that obtains the model position data Pm, the model velocity data Vm, and the model acceleration data Am without using the differentiators.

In the vibration isolation control system of the present invention, it is sufficient that a parameter calculated by the computing unit is the parameter corresponding to acceleration/deceleration thrust for moving the vibration-excitation movable mass, and the parameter calculated by the computing unit can be appropriately selected. For example, the thrust itself can be used as the parameter, or acceleration for moving a vibration-excitation movable mass and a current value supplied to a vibration excitation driving unit can be further used as the parameter. Moreover, a vibration isolation actuator, which moves a vibration isolation movable unit by means of a vibration isolation driving unit made by combining a rotary motor and a ball screw, can use torque and angular acceleration as the parameter. The position command Cp (for example, see FIG. 2) used when the computing unit calculates the parameter can be supplied to the computing unit from the vibration excitation controller in addition to an upper-level controller. When the position command Cp is supplied from the vibration excitation controller to the computing unit, the upper-level controller can create the position command Cp, or the vibration excitation controller can create the position command Cp.

When the computing unit is incorporated into the vibration excitation controller, the parameter corresponding to acceleration/deceleration thrust used when the vibration-excitation position/velocity controlling unit 61 of the vibration excitation controller creates the thrust command $Cf_1$ (see FIG. 1) and the parameter corresponding to acceleration/deceleration thrust calculated by the computing unit can be different from each other.

The counter thrust computing unit 33 (see FIG. 4) constituting the vibration isolation controller can use a filter (bandpass filter) tailored to natural vibration frequency of the supporting member or the apparatus in which the vibration isolation actuator is arranged. When the counter thrust computing unit 33 is configured by using the filter, persistent vibration induced by natural vibration of the supporting member or the apparatus can be easily suppressed.

Figure 12:
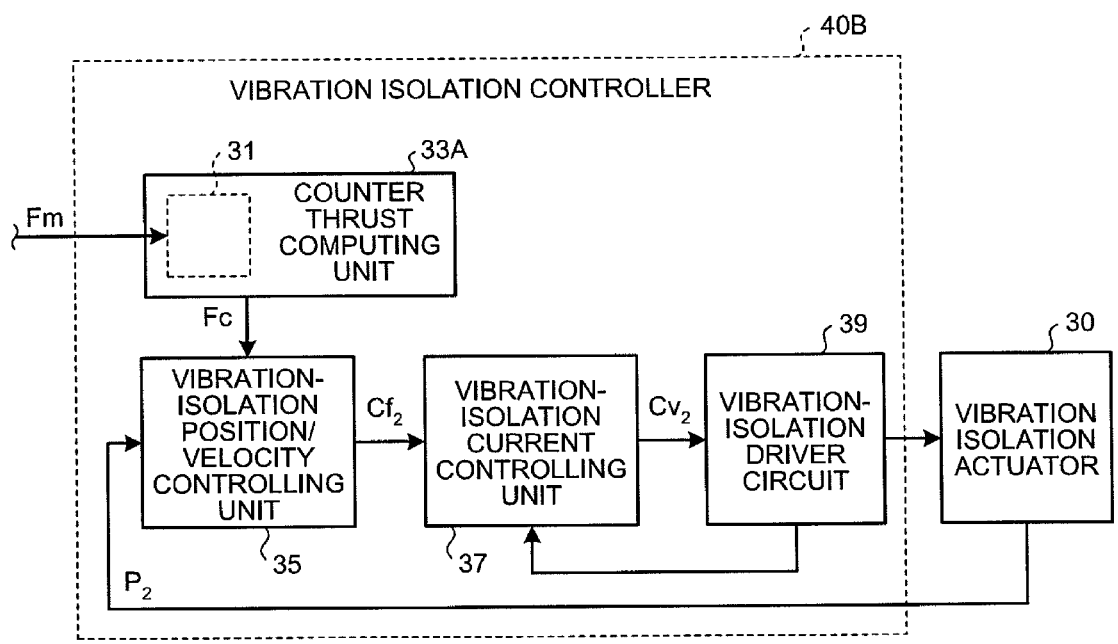
FIG. 12 is a functional block diagram schematically illustrating an example of a vibration isolation controller constituting the vibration isolation control system of the present invention in which a counter thrust computing unit uses a filter.

FIG. 12 is a functional block diagram schematically illustrating an example of a vibration isolation controller in which a counter thrust computing unit uses a filter. A vibration isolation controller 40B shown in FIG. 12 has the same configuration as that of the vibration isolation controller 40 shown in FIG. 4 except that the vibration isolation controller 40B has a counter thrust computing unit 33A including a filter 31. In FIG. 12, the components shown that have the same functions as those of the components shown in FIG. 4 are denoted by the same reference numbers, and the explanations thereof are omitted.

The filter 31 receives the model thrust data Fm, and extracts a component exciting the natural vibration of the supporting member or the apparatus from the model thrust data Fm. In other words, the filter 31 extracts a component (including a component corresponding to natural frequency), which corresponds to natural vibration frequency of the apparatus to which the vibration isolation control system is coupled, from the model thrust data Fm. The filter 31 can be constituted in various manners. For example, the filter 31 can be constituted of one bandpass filter, or can be constituted by combining two notch filters having different attenuation bands.

When the filter 31 is constituted of one bandpass filter, because the transfer function F(s) of the bandpass filter is expressed by, for example, the following equation, a bandpass filter for extracting the component from the model thrust data Fm can be obtained by appropriately selecting the values of $\omega_0$, $\zeta_r$, and $\zeta_b$:

$$F(s)=2\zeta_b\omega_0 s/(s^2+2\zeta_r\omega_0 s+\omega_0^2).$$

In the above equation, $\omega_0$ indicates a setting frequency, and $\zeta_r$ and $\zeta_b$ respectively indicate coefficients determining a bandwidth and sharpness of a band. Moreover, a method for constituting the filter 31 is not limited to the above method, and the filter 31 can be constituted in various manners.

The counter thrust computing unit 33A derives counter thrust data Fc based on the component extracted from the filter 31, and supplies the data Fc to the vibration-isolation position/velocity controlling unit 35. The vibration-isolation position/velocity controlling unit 35 performs a predetermined operation by using the counter thrust data Fc and real position information $P_2$ of the vibration isolation movable unit to be supplied from the vibration isolation actuator 30 to create the thrust command $Cf_2$ for moving the vibration isolation movable unit. The natural vibration is canceled out by moving the vibration isolation movable unit based on the thrust command $Cf_2$.

In other words, the vibration isolation control system including the vibration isolation controller 40B controls the operation of the vibration isolation driving unit so that a component exciting the natural vibration of the supporting member or the apparatus, in which the component is a component of a vibration exciting force acting on the apparatus to which the vibration isolation control system is coupled when the vibration-excitation movable mass is moved, is canceled out by the movement of the vibration isolation movable unit. At this time, because a vibration induced by natural vibration can be canceled out even though the displacement itself caused by the vibration exciting force cannot be canceled out, persistent vibration (residual vibration) after the vibration-excitation movable mass is moved can be effectively suppressed. As the result, even when a moving distance of the vibration isolation movable unit is reduced compared with the vibration isolation control system explained in the first to fifth embodiments, the persistent vibration (residual vibration) of the apparatus can be suppressed.

When the frictional thrust estimating unit is provided in the vibration isolation controller as in the vibration isolation control system explained in the second embodiment, the configuration of the frictional thrust estimating unit can have various kinds of configurations other than the configuration shown in FIG. 6. FIGS. 13 to 16 are functional block diagrams each schematically illustrating another example of the frictional thrust estimating unit.

Figure 13:
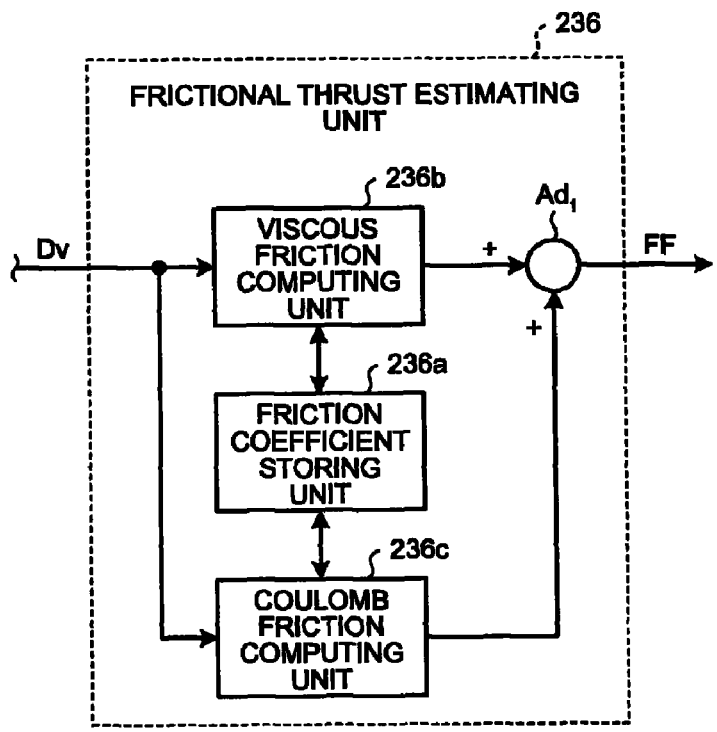
FIG. 13 is a functional block diagram schematically illustrating another example of the frictional thrust estimating unit provided in the vibration isolation controller constituting the vibration isolation control system of the present invention if required.

A frictional thrust estimating unit 236 shown in FIG. 13 is an estimating unit that estimates viscous friction and Coulomb friction of the vibration isolation movable unit and estimates frictional thrust based on these estimation results when the vibration isolation movable unit is moved, and includes a friction coefficient storing unit 236a, a viscous friction computing unit 236b, a Coulomb friction computing unit 236c, and an adder $Ad_1$.

The friction coefficient storing unit 236a stores therein a viscous friction coefficient and a Coulomb friction coefficient when the vibration isolation movable unit is moved in advance. The viscous friction computing unit 236b calculates the amount of viscous friction by using the velocity data Dv of the vibration isolation movable unit calculated in the process of creating the thrust command $Cf_3$ (see FIG. 5) by the vibration-isolation position/velocity controlling unit 35a and the viscous friction coefficient stored in the friction coefficient storing unit 236a. Viscous friction when the vibration isolation movable unit is moved is proportional to the velocity of the vibration isolation movable unit. Moreover, the Coulomb friction computing unit 236c calculates the amount of Coulomb friction by using the velocity data Dv and the Coulomb friction coefficient stored in the friction coefficient storing unit 236a. Coulomb friction when the vibration isolation movable unit is moved is also proportional to the velocity of the vibration isolation movable unit. The adder $Ad_t$ adds the computation result of the viscous friction computing unit 236b and the computation result of the Coulomb friction computing unit 236c. The addition result of the adder Ad₁ becomes the frictional thrust estimation data FF estimated by the frictional thrust estimating unit 236.

Figure 14:
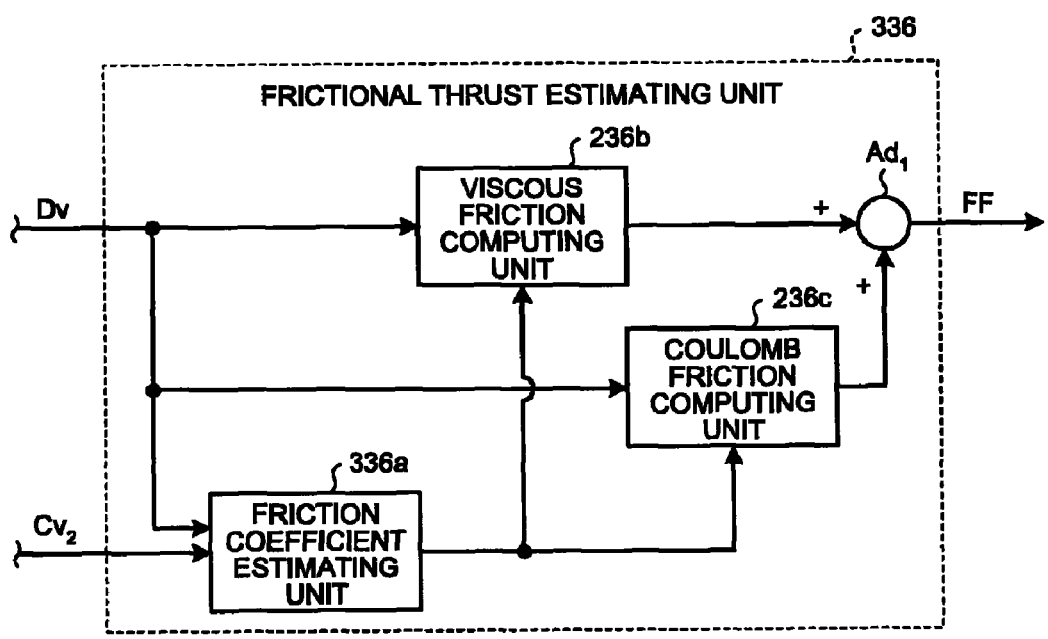
FIG. 14 is a functional block diagram schematically illustrating a still another example of the frictional thrust estimating unit provided in the vibration isolation controller constituting the vibration isolation control system of the present invention if required.

A frictional thrust estimating unit 336 shown in FIG. 14 is an estimating unit that estimates frictional thrust based on the estimation results of viscous friction and Coulomb friction when the vibration isolation movable unit is moved, similarly to the frictional thrust estimating unit 236 shown in FIG. 13, and includes a friction coefficient estimating unit 336a, the viscous friction computing unit 236b, the Coulomb friction computing unit 236c, and the adder Ad₁. In FIG. 14, the components that have the same functions as those of the components shown in FIG. 13 are denoted by the same reference numbers, and the explanations thereof are omitted.

The friction coefficient estimating unit 336a is constituted of, for example, an adaptive observer of Krreiselmeir, and estimates a viscous friction coefficient and a Coulomb friction coefficient when the vibration isolation movable unit is moved, based on the velocity data Dv of the vibration isolation movable unit calculated in the process of creating the thrust command Cf₃ (see FIG. 5) by the vibration-isolation position/velocity controlling unit 35a and the voltage command Cv₂ (see FIG. 5) made by the vibration-isolation current controlling unit 37. The viscous friction coefficient data estimated by the friction coefficient estimating unit 336a is supplied to the viscous friction computing unit 236b and the Coulomb friction coefficient data is supplied to the Coulomb friction computing unit 236c. The viscous friction computing unit 236b calculates the amount of viscous friction by using the velocity data Dv and the viscous friction coefficient data, and the Coulomb friction computing unit 236c calculates the amount of Coulomb friction by using the velocity data Dv and the Coulomb friction coefficient. Then, the adder Ad₁ adds the computation result of the viscous friction computing unit 236b and the computation result of the Coulomb friction computing unit 236c. The addition result of the adder Ad₁ becomes the frictional thrust estimation data FF estimated by the frictional thrust estimating unit 336.

Figure 15:
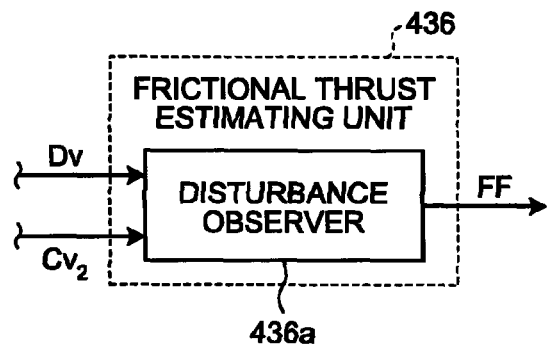
FIG. 15 is a functional block diagram schematically illustrating a still another example of the frictional thrust estimating unit provided in the vibration isolation controller constituting the vibration isolation control system of the present invention if required.

A frictional thrust estimating unit 436 shown in FIG. 15 estimates frictional thrust when the vibration isolation movable unit is moved by means of a disturbance observer 436a. The disturbance observer 436a is a minimal-order observer that uses given motor velocity and step disturbance as state variables. The frictional thrust estimating unit 436 uses as the frictional thrust estimation data FF a signal output from the disturbance observer 436a when the velocity data Dv and the voltage command Cv₂ are input into the disturbance observer 436a.

Figure 16:
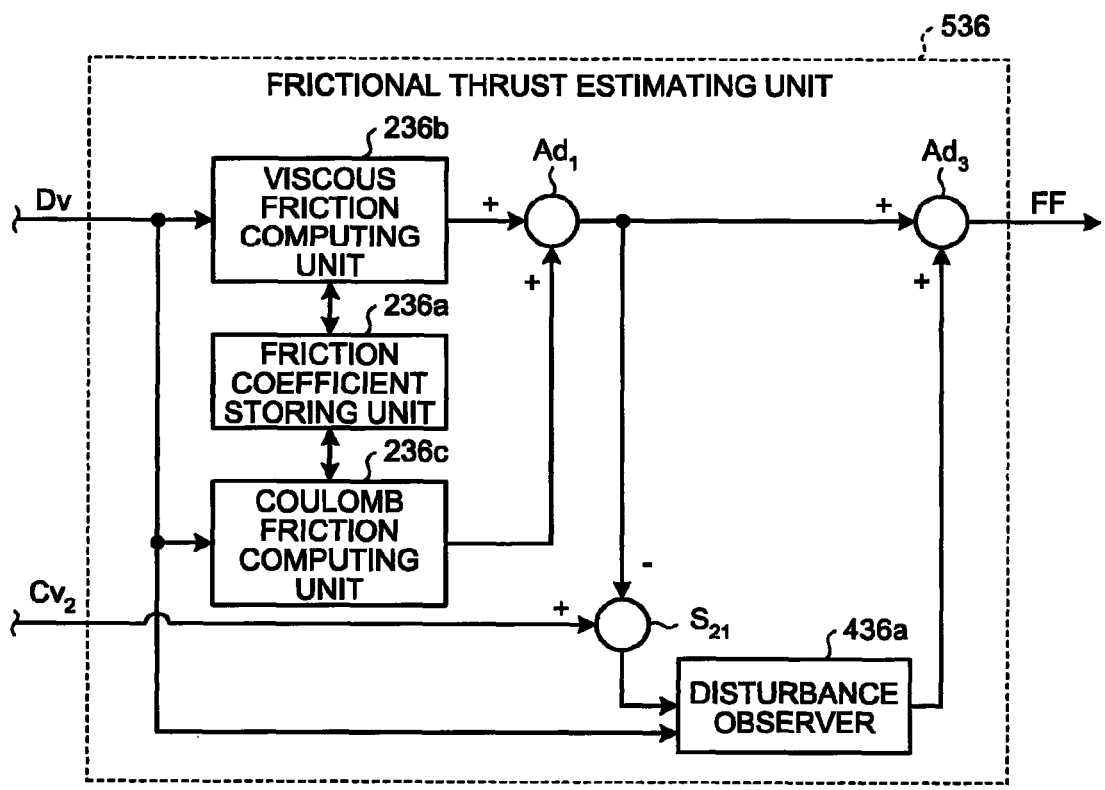
FIG. 16 is a functional block diagram schematically illustrating a still another example of the frictional thrust estimating unit provided in the vibration isolation controller constituting the vibration isolation control system of the present invention if required.

A frictional thrust estimating unit 536 shown in FIG. 16 has a configuration obtained by combining the frictional thrust estimating unit 236 shown in FIG. 13 and the frictional thrust estimating unit 436 shown in FIG. 15. In FIG. 16, the components that have the same functions as those of the components shown in FIG. 13 or 15 are denoted by the same reference numbers, and the explanations thereof are omitted.

The frictional thrust estimating unit 536 adds the computation result of the viscous friction computing unit 236b and the computation result of the Coulomb friction computing unit 236c by means of the adder Ad₁ to calculate the sum of the results, and calculates the difference between the sum and the voltage command Cv₂ by means of a subtracter S₂₁. Then, the computation result of the subtracter S₂₁ and the velocity data Dv are input into the disturbance observer 436a, and a signal output from the disturbance observer 436a is supplied to the adder Ad₃. Then, an adder Ad₃ adds the output signal and the computation result of the adder Ad₁. The computation result of the adder Ad₃ becomes the frictional thrust estimation data FF.

Regardless of whether the frictional thrust estimating unit is provided in the vibration isolation controller, the vibration isolation control system of the present invention can include a plurality of vibration isolation actuators that is controlled by one or more vibration isolation controllers. In this case, the vibration isolation actuators can be arranged so that the moving directions of the vibration isolation movable units are parallel to each other, or can be divided into a plurality of groups of which the moving directions are different from one another. The vibration isolation controllers and the vibration isolation actuators can be arranged according to one-to-one correspondence relationship, the vibration isolation controllers and the groups of the vibration isolation actuators can be arranged according to one-to-one correspondence relationship, or one vibration isolation controller can be arranged to correspond to all vibration isolation actuators. Similarly, in a case of the computing unit constituting the vibration isolation control system, the computing units and the vibration isolation controllers can be arranged according to one-to-one correspondence relationship, the computing units and the plurality of groups of the vibration isolation controllers can be arranged according to one-to-one correspondence relationship, or one computing unit can be arranged to correspond to all vibration isolation controllers.

For example, when one vibration excitation actuator is arranged in the apparatus, a plurality of vibration isolation actuators can be arranged so that the moving directions of the vibration isolation movable units of the vibration isolation actuators are parallel to the moving direction of the vibration excitation movable unit. Moreover, when a plurality of vibration excitation actuators is arranged in the apparatus and the vibration excitation actuators are divided into a plurality of groups based on the moving direction of the vibration excitation movable unit, a plurality of vibration isolation actuators can be arranged so that each of the groups corresponds to at least one vibration isolation actuator. At this time, it is preferred that the vibration isolation actuators be divided into groups the number of which is the same as that of the vibration excitation actuators.

The vibration isolation controller and the computing unit, the vibration isolation controller and the vibration excitation controller, and the vibration isolation controller and the upper-level controller, which constitute the vibration isolation control system, can be respectively connected to each other by wire or wireless. Moreover, they can be respectively connected to each other with a network or without a network. When they are respectively connected to each other by wireless or with a network, a transmission/reception processing unit that sends and receives data, commands, and information is placed at a desired point. The components constituting the computing unit are also connected to each other in the same manner.

When vibration-excitation movable mass is changed, for example, with the advance of the process of the object 105 (see FIG. 1), the vibration-excitation movable mass can be calculated, for example, according to load inertia estimation. Moreover, when the apparatus to which the vibration isolation control system is coupled is a numerical control apparatus, for example, the storage unit 10 can store therein data indicative of the change of the mass of the object 105 with the advance of process, and the computing unit can appropriately read the data in accordance with the advance of process and calculate the vibration-excitation movable mass by adding the data to the mass of the vibration excitation movable unit.

The vibration isolation control system of the present invention can be used along with a vibration isolation control system based on another principle, for example, a vibration isolation control system using a vibration detector that can detect the magnitude and the direction of vibration, if required. Other than those above, various changes, modifications, combinations, or the like can be performed on the vibration isolation control system of the present invention.

The invention claimed is:

1. A vibration isolation control system that is coupled to an apparatus in which a vibration excitation actuator that includes a vibration excitation movable unit movable in one axial direction is arranged and that suppresses a vibration that acts on the apparatus when an object is mounted on the vibration excitation movable unit and the vibration excitation movable unit is moved, the vibration isolation control system comprising:
   a storage unit that stores therein a model operation parameter of the vibration excitation actuator and vibration-excitation movable mass data obtained by adding a mass of the vibration excitation movable unit and a mass of the object;
   a computing unit that simulates an ideal operation of the vibration excitation actuator by using at least the model operation parameter and the vibration-excitation movable mass data and calculates a parameter corresponding to acceleration/deceleration thrust for moving the vibration-excitation movable mass;
   a vibration isolation actuator that includes a vibration isolation driving unit fixed to the apparatus and a vibration isolation movable unit driven by the vibration isolation driving unit to move in the axial direction; and
   a vibration isolation controller that determines a control content of the vibration isolation driving unit based on the parameter corresponding to the acceleration/deceleration thrust calculated by the computing unit and controls an operation of the vibration isolation driving unit so that a force canceling a reaction force, which acts on the apparatus when the vibration-excitation movable mass is moved, acts on the apparatus by moving the vibration isolation movable unit.

2. The vibration isolation control system according to claim 1, wherein the parameter corresponding to the acceleration/deceleration thrust is any of thrust, torque, acceleration, and angular acceleration for moving the vibration-excitation movable mass.

3. The vibration isolation control system according to claim 1, wherein the computing unit is provided in the vibration excitation controller that controls an operation of the vibration excitation actuator.

4. The vibration isolation control system according to claim 1, wherein the vibration isolation controller includes a frictional thrust estimating unit that estimates frictional thrust occurring when the vibration isolation movable unit is moved and determines the control content of the vibration isolation driving unit based on the frictional thrust estimated by the frictional thrust estimating unit and the parameter corresponding to the acceleration/deceleration thrust.

5. The vibration isolation control system according to claim 1, wherein the vibration isolation controller extracts a component exciting natural vibration of the apparatus from the parameter corresponding to the acceleration/deceleration thrust calculated by the computing unit and determines the control content of the vibration isolation driving unit by using the component.

6. A vibration isolation control system that is coupled to an apparatus in which a plurality of vibration excitation actuators each including a vibration excitation movable unit movable in one axial direction is arranged and that suppresses a vibration that acts on the apparatus when an object is mounted on at least one of the vibration excitation movable units moving in a predetermined axial direction and the vibration excitation movable units are moved, the vibration isolation control system comprising:
   a storage unit that stores therein a model operation parameter of a vibration excitation actuator of which the vibration excitation movable unit moves in the predetermined axial direction and vibration-excitation movable mass data obtained by adding a mass of the vibration excitation movable unit moving in the predetermined axial direction and a mass of the object;
   a computing unit that simulates ideal operations of the vibration excitation actuators by using at least the model operation parameter and the vibration-excitation movable mass data and calculates a parameter corresponding to acceleration/deceleration thrust for moving the vibration-excitation movable mass;
   a vibration isolation actuator that includes a vibration isolation driving unit fixed to the apparatus and a vibration isolation movable unit driven by the vibration isolation driving unit to move in the predetermined axial direction; and
   a vibration isolation controller that determines a control content of the vibration isolation driving unit based on the parameter corresponding to the acceleration/deceleration thrust calculated by the computing unit and controls an operation of the vibration isolation driving unit so that a force canceling a reaction force, which acts on the apparatus when the vibration-excitation movable mass is moved in the predetermined axial direction, acts on the apparatus by moving the vibration isolation movable unit.

7. The vibration isolation control system according to claim 6, wherein the parameter corresponding to the acceleration/deceleration thrust is any of thrust, torque, acceleration, and angular acceleration for moving the vibration-excitation movable mass.

8. The vibration isolation control system according to claim 6, wherein the vibration isolation controller includes a frictional thrust estimating unit that estimates frictional thrust occurring when the vibration isolation movable unit is moved and determines the control content of the vibration isolation driving unit based on the frictional thrust estimated by the frictional thrust estimating unit and the parameter corresponding to the acceleration/deceleration thrust.

9. The vibration isolation control system according to claim 6, wherein the vibration isolation controller extracts a component exciting natural vibration of the apparatus from the parameter corresponding to the acceleration/deceleration thrust calculated by the computing unit and determines the control content of the vibration isolation driving unit by using the component.

* * * * *